US012165675B2

(12) United States Patent
Waterman

(10) Patent No.: US 12,165,675 B2
(45) Date of Patent: *Dec. 10, 2024

(54) SYSTEMS AND METHODS FOR CREATING CUSTOMIZED CONTENT

(71) Applicant: Adeia Guides, Inc., San Jose, CA (US)

(72) Inventor: Alan Waterman, Merced, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/517,844

(22) Filed: Nov. 3, 2021

(65) Prior Publication Data

US 2022/0059134 A1     Feb. 24, 2022

Related U.S. Application Data

(63) Continuation of application No. 16/451,823, filed on Jun. 25, 2019, now Pat. No. 11,195,554, which is a continuation-in-part of application No. 16/363,919, filed on Mar. 25, 2019, now Pat. No. 11,082,757.

(51) Int. Cl.
    *G11B 27/031*     (2006.01)
    *G06V 20/40*     (2022.01)

(52) U.S. Cl.
    CPC ............ *G11B 27/031* (2013.01); *G06V 20/46* (2022.01); *G06V 20/49* (2022.01)

(58) Field of Classification Search
None
See application file for complete search history.

(56) References Cited

U.S. PATENT DOCUMENTS

| | | | |
|---|---|---|---|
| 6,100,881 | A | 8/2000 | Gibbons et al. |
| 6,289,165 | B1 | 9/2001 | Abecassis |
| 7,756,945 | B1 | 7/2010 | Andreessen et al. |
| 8,578,416 | B1 | 11/2013 | Radloff et al. |
| 8,937,620 | B1 | 1/2015 | Teller |
| 9,106,812 | B1 | 8/2015 | Price et al. |
| 9,671,940 | B1 | 6/2017 | Malik et al. |
| 10,074,200 | B1 | 9/2018 | Yeturu |

(Continued)

FOREIGN PATENT DOCUMENTS

| | | |
|---|---|---|
| CN | 106530227 A | 3/2017 |
| JP | 2005522108 A | 7/2005 |
| JP | 2008539479 A | 11/2008 |

OTHER PUBLICATIONS

U.S. Appl. No. 16/363,919, filed Mar. 25, 2019, Alan Waterman.

(Continued)

*Primary Examiner* — Daniel T Tekle
(74) *Attorney, Agent, or Firm* — Haley Guiliano LLP

(57) ABSTRACT

Systems and methods are disclosed for generating content. The system identifies first and second objects in a plurality of frames of a source content segment. The system creates a data structure for each object, where data structures comprise attributes of the respective objects. Furthermore, the data structures are generated such that each object may be reconstructed based on the data of the respective data structure. Later, one of the data structures is modified by changing an attribute. Then, a resulting content segment is generated by a system that reconstructs a first modified object based on the first modified data structure and reconstructs the second object based on the second data structure.

20 Claims, 25 Drawing Sheets

(56) References Cited

U.S. PATENT DOCUMENTS

| | | | |
|---|---|---|---|
| 10,665,030 | B1 | 5/2020 | Shekhar et al. |
| 10,685,059 | B2 | 6/2020 | Kim et al. |
| 11,256,863 | B2 | 2/2022 | Ahamed et al. |
| 11,562,016 | B2 | 1/2023 | Saito et al. |
| 11,604,827 | B2 | 3/2023 | Nasir et al. |
| 11,914,645 | B2 | 2/2024 | Nasir et al. |
| 11,934,777 | B2 | 3/2024 | Ahamed et al. |
| 12,079,955 | B2 | 9/2024 | Waterman |
| 2003/0105750 | A1 | 6/2003 | Chaboche |
| 2004/0004665 | A1 | 1/2004 | Kashiwa |
| 2006/0194181 | A1 | 8/2006 | Rosenberg |
| 2006/0230331 | A1 | 10/2006 | Abanami et al. |
| 2007/0147654 | A1 | 6/2007 | Clatworthy et al. |
| 2007/0296723 | A1 | 12/2007 | Williams |
| 2007/0300157 | A1 | 12/2007 | Clausi et al. |
| 2008/0055316 | A1 | 3/2008 | Pahud et al. |
| 2008/0165194 | A1 | 7/2008 | Uranaka et al. |
| 2009/0144609 | A1 | 6/2009 | Liang et al. |
| 2009/0210395 | A1 | 8/2009 | Sedam |
| 2009/0240727 | A1 | 9/2009 | Sheehan |
| 2010/0050083 | A1 | 2/2010 | Axen et al. |
| 2010/0150526 | A1 | 6/2010 | Rose et al. |
| 2011/0106656 | A1 | 5/2011 | Schieffelin |
| 2011/0137753 | A1* | 6/2011 | Moehrle ............. G06V 20/49 725/60 |
| 2011/0153047 | A1 | 6/2011 | Cameron et al. |
| 2011/0239119 | A1 | 9/2011 | Phillips et al. |
| 2011/0261030 | A1 | 10/2011 | Bullock |
| 2012/0005616 | A1 | 1/2012 | Walsh et al. |
| 2013/0080881 | A1 | 3/2013 | Goodspeed et al. |
| 2014/0164593 | A1 | 6/2014 | Murray et al. |
| 2014/0207778 | A1 | 7/2014 | Raichelgauz et al. |
| 2015/0011298 | A1 | 1/2015 | Haid et al. |
| 2015/0016714 | A1 | 1/2015 | Chui |
| 2015/0154192 | A1 | 6/2015 | Lysne et al. |
| 2015/0254497 | A1* | 9/2015 | Jang ............. H04N 5/50 382/124 |
| 2015/0269441 | A1* | 9/2015 | Mj ............. G06V 20/46 382/103 |
| 2016/0110612 | A1* | 4/2016 | Sabripour ............. G06T 7/20 382/103 |
| 2017/0011280 | A1 | 1/2017 | Soldevila et al. |
| 2017/0025152 | A1 | 1/2017 | Jaime et al. |
| 2017/0097969 | A1 | 4/2017 | Stein et al. |
| 2017/0098152 | A1 | 4/2017 | Kerr et al. |
| 2017/0300748 | A1 | 10/2017 | Austin et al. |
| 2017/0315966 | A1 | 11/2017 | Iyer et al. |
| 2018/0107638 | A1 | 4/2018 | Ekambaram et al. |
| 2018/0176661 | A1 | 6/2018 | Varndell et al. |
| 2018/0225380 | A1 | 8/2018 | Netto et al. |
| 2018/0300361 | A1 | 10/2018 | Ben-Aharon et al. |
| 2018/0300958 | A1 | 10/2018 | Schriber et al. |
| 2018/0308523 | A1 | 10/2018 | Silvestri et al. |
| 2018/0356967 | A1 | 12/2018 | Rasheed |
| 2019/0005699 | A1 | 1/2019 | Anderson |
| 2019/0107927 | A1 | 4/2019 | Schriber et al. |
| 2019/0155955 | A1 | 5/2019 | Castaneda et al. |
| 2019/0267041 | A1 | 8/2019 | Ricciardi |
| 2019/0304157 | A1* | 10/2019 | Amer ............. G06V 40/23 |
| 2019/0370984 | A1* | 12/2019 | Tsai ............. G06T 7/254 |
| 2020/0019370 | A1 | 1/2020 | Doggett et al. |
| 2020/0098283 | A1 | 3/2020 | Vaculin et al. |
| 2020/0233903 | A1 | 7/2020 | Mashrabov et al. |
| 2020/0312368 | A1 | 10/2020 | Waterman |
| 2020/0314508 | A1 | 10/2020 | Waterman |
| 2020/0334246 | A1 | 10/2020 | Chen et al. |
| 2020/0409990 | A1 | 12/2020 | Saito et al. |
| 2021/0019368 | A1 | 1/2021 | Ahamed et al. |
| 2021/0027427 | A1 | 1/2021 | Waterman |
| 2021/0042258 | A1 | 2/2021 | Hitchins |
| 2021/0117409 | A1 | 4/2021 | O'Connor et al. |
| 2021/0263964 | A1 | 8/2021 | Nasir et al. |
| 2021/0377629 | A1 | 12/2021 | Waterman |
| 2021/0407044 | A1 | 12/2021 | Waterman |
| 2022/0138415 | A1 | 5/2022 | Ahamed et al. |
| 2023/0185848 | A1 | 6/2023 | Nasir et al. |
| 2023/0229694 | A1 | 7/2023 | Saito et al. |
| 2024/0152553 | A1 | 5/2024 | Nasir et al. |
| 2024/0160843 | A1 | 5/2024 | Ahamed et al. |
| 2024/0205518 | A1 | 6/2024 | Waterman |

OTHER PUBLICATIONS

U.S. Appl. No. 16/451,823, filed Jun. 25, 2019, Alan Waterman.
U.S. Appl. No. 17/358,728, filed Jun. 25, 2021, Alan Waterman.
U.S. Appl. No. 16/453,841, filed Jun. 26, 2019, Sakura Saito.
U.S. Appl. No. 16/517,322, filed Jul. 19, 2019, Shakir Sharfraz Ashfaq Ahamed.
U.S. Appl. No. 17/578,114, filed Jan. 18, 2022, Shakir Sharfraz Ashfaq Ahamed.
U.S. Appl. No. 16/522,332, filed Jul. 25, 2019, Alan Waterman.
U.S. Appl. No. 17/472,138, filed Sep. 10, 2021, Alan Waterman.
U.S. Appl. No. 16/658,510, filed Oct. 21, 2019, Lance G. O'Connor.
U.S. Appl. No. 16/844,511, filed Apr. 9, 2020, Sahir Nasir.
PCT International Search Report and Written Opinion for International Application No. PCT/US2020/020075, dated Jun. 22, 2020 (14 pages).
PCT Search Report and Written Opinion in PCT/US2020/041121 dated Oct. 16, 2020.
Florescu, D., et al., "Storing and Querying XML Data using an RDMBS", Quarterly Bulletin of the Computer Society of the IEEE Technical Committee on Data Engineering, Sep. 1, 1999, pp. 27-34.
Luebke, David, "A Developer's Survey of Polygonal Simplification Algorithms", IEEE Computer Graphics and Applications, Aug. 7, 2002, pp. 24-35.
Po et al., , "Automatic 2D-to-3D video conversion technique based on depth-from-motion and color segmentation,", IEEE10th International Conference, https://ieeexplore.ieee.org/abstract/document/5655850., Oct. 24-28, 2010, 4 pages.
Tsaftaris et al., "Colorizing a Masterpiece", IEEE Signal Processing Magazine, May 2011, 7 pages.
Turk, Greg, "Re-Tiling Polygonal Surfaces", Computer Graphiw and Interactive Techniques, Jul. 1, 1992, pp. 55-64.

* cited by examiner

Example effects neural network training model inputs:

"Water Splash" 710

"Blood Splatter" 720

Pseudo code

```
content_structure_ID = CS133
    attribute_table_ID = AT131
        object_data_structure_ID = ODS134
            description_structure_ID = DS135
                object_ID = 111
                    object_type = human
                        object_feature_0 = male
                        object_feature_1 = 40_years
                        object_feature_2 = blue_jeans
                        object_feature_3 = brown_wavy_hair
                        object_feature_4 = latino
                        object_feature_5 = 5'11"
                        ...
                        object_state_0 = determined
                        object_state_1 = running
                        object_state_2 = sliding
                        object_state_3 = flailing
                        object_state_4 = falling
                        object_state_5 = grimacing
                object_ID = 112
                    object_type = 1980_dodge_charger
                        object_feature_0 = orange
                        object_feature_1 = dusty
                        object_state_1 = driving
                object_ID 113
                    object_type = AR-15_rifle
                        object_state_0 = used
                object_ID=114
                    object_type = foot
                        object_feature_0 = army_boot
                        object_feature_1 = shiny_black
        action_structure_ID = AS136
            action_0 (111, 112, sliding_across)
            action_1 (111, 113, holding)
                ...
```

FIG. 9A

Pseudo code content_structure_ID = CS133
    mapping_ID = M132
        for (object_ID = 111, 00:00 – 00:11)
            object_state = [0, 00:00 – 00:02, 27], [1, 00:02 – 00:05, 35], [2, 00:05- 00:07,99], [3, 00:05 – 00:08,35], [4, 00:07- 00:08, 78], [5, 00:08-00:11, 45]

absolute_location = [00:00 – 00:02,(11.34, 23.34, 23.87)], [00:02-00:07, (12.02, 21.23, 05.67)], [00:07-00:11, (12.10, 11.13, 05.45)]

relative_location = [112, 00:00 – 00:02, (2.7, 30°)], [113, 00:02-00:07, (12.7, 47°)], [114, 00:07-00:11, (11.13, 132°)]

absolute_motion = [00:00 – 00:02,($\vec{v}_1$)], [00:02-00:7, ($\vec{v}_2$)], [00:07-00:11, ($\vec{v}_3$)]

Relative_motion = [112, 00:00 – 00:02,($\vec{v}_4$)], [113, 00:02-00:7, ($\vec{v}_5$)], [113, 00:07-00:11, ($\vec{v}_6$)], [114, 00:08 – 00:11, $\overrightarrow{(v_7)}$]

for (object_ID = 112, 00:00 – 00:07)
            ...

| | Object 1 | Object 2 | Object 3 |
|---|---|---|---|
| T16-0 |  1901 |  1903 |  1905 |
| T16-1 |  1907 |  1909 |  1911 |
| T16-2 |  1913 |  1915 |  1917 |

2300

2301

2303

2305

2307

2309

2311

2313

2315

2317

2319

SYSTEMS AND METHODS FOR CREATING CUSTOMIZED CONTENT

CROSS REFERENCE TO RELATED APPLICATION

This application is a continuation application of U.S. patent application Ser. No. 16/451,823, filed Jun. 25, 2019, which is a continuation-in-part of U.S. patent application Ser. No. 16/363,919, filed Mar. 25, 2019, now U.S. Pat. No. 11,082,757, which are hereby incorporated by reference herein in their entireties.

TECHNICAL FIELD

The present disclosure is directed to content analytics and creation, and more particularly to creating a content design structure that is used to create new content.

BACKGROUND

Existing content providers such as traditional broadcasting networks, production companies, and over-the-top service providers often produce new content such as movies or television shows through audio/video capture of sets, filming actors/actresses and/or models. A significant amount of time, expense and efforts are usually required in developing scripts, costumes and sets as well as casting, filming and post-production editing in the content creation process. In addition, some existing computer-based post-production tools are used to add or edit computer-generated content such as special visual effects to video content from filming. But these tools often require labor-intensive programming to define attributes, motion paths, and features for an added visual effect, which is subsequently rendered frame-by-frame to produce the visual effect.

SUMMARY

In view of this problem, systems and methods are disclosed for generating a content structure that can then be used as a content design building block. Specifically, new content can be automatically generated by combining, replacing or mixing and matching objects, actions, settings, effects, audio, etc., from any number of previously stored content structures to create a new content structure, which is then rendered as a new content segment. Content segments are then stitched together to generate a finished content stream. In this way, new and original content can be created without the traditionally expensive and labor-intensive filming or computer animation processes.

Specifically, a content deconstruction engine is configured to create a content structure by deconstructing a segment of a content asset into an attribute table of structural listing of data fields and corresponding mappings. The data fields correspond to attributes of objects, settings, effects, etc., that appeared in the segment of a content asset, and the mapping includes attribute values corresponding to each attribute. In this way, the content deconstruction engine stores segments of content assets in a deconstructed form as content structures having a table of attributes and mappings of attribute values mapped to the corresponding attributes. These deconstructed content structures provide knowledge of attributes such as features of different objects, movement and interaction patterns between the objects, and relationships between the objects that appear in the original content segments.

To deconstruct a segment of content and generate a content structure, the content deconstruction engine performs pattern recognition on the segment to identify objects such as characters, scenery, lighting, props, action, motion, special effects, audio tracks, and/or the like. For each identified object, the content deconstruction engine determines a plurality of attributes related to the object. For example, an object may be a human character in the content segment and attributes of the human character object may include the height, race, age, gender, hair color, eye color, body type, a facial pattern signature, a movement pattern, a relative location with other objects, an interaction with other objects, and/or the like. The attributes are stored in the attribute table as a listing of data field names in the content structure.

The content deconstruction engine maps attributes of the object to attribute values depicting the actual object that appeared in the content segment, and the corresponding sub-segment within the content segment during which a specific attribute value appears. The attribute value, a presence indicator including the associated start time and end time of the sub-segment during which the respective attribute value is present in the content segment, and the mapping relationship with the respective attribute are collectively, separately, or independently referred to herein as "mapping." The content deconstruction engine then creates and stores the generated content structure including the attribute table and the associated mapping at a content design database.

The content structure, together with many other previously created and stored content structures can then be used to create customized content. Specifically, a content construction engine is implemented to retrieve one or more previously stored content structures and combine, replace or mix-match objects, settings, effects, audios, etc., from these content structures to create a new content structure. For example, the content construction engine may map relevant attributes of a particular object in a first content structure to attribute values from the mapping in a second content structure. The content construction engine then creates a new content structure having the object structure relating to the particular object being populated with attribute values from the second content structure, e.g., a human object structure can be modified with physical appearance and movement patterns relating to a monster creature derived from the attribute values from the second content structure. In this way, customized new content can be created using the content structure as a framework and customized mapping to fill in the framework without the labor of re-casting, re-setting or re-filming.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 9A-B provide pseudo-code examples of content structure illustrated in FIGS. 4-5 and 6A-D, according to some embodiments described herein;

DETAILED DESCRIPTION

Figure 1:
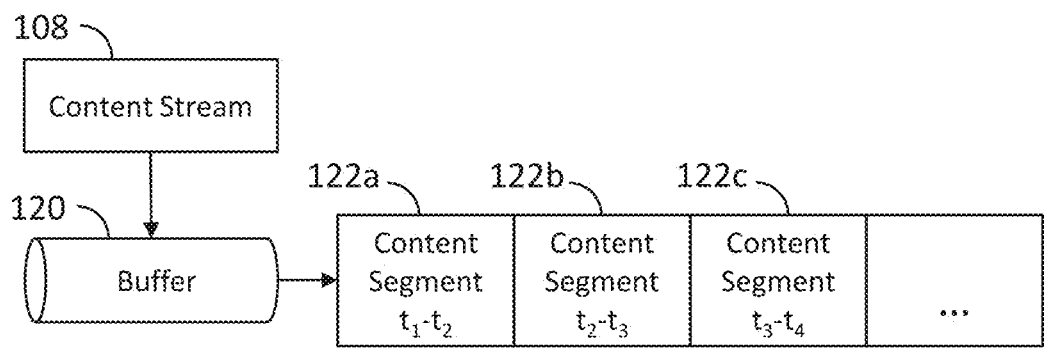
FIG. 1 depicts an example block diagram illustrating aspects of deconstructing a content asset into a number of content segments, according to some embodiments described herein.

FIG. 1 depicts an example block diagram illustrating aspects of deconstructing a content asset into a number of content segments, according to some embodiments described herein. Pre-processing system 100 includes a buffer 120, at which a content stream 108 is received and divided into a plurality of content segments 122a-c. For example, a content deconstruction engine (shown at 130 in FIG. 2) may be implemented to generate content segments 122a-c from the content stream 108. The content deconstruction engine may be implemented at a client station, a server, a set-top box, a game console, or any other hardware or software system or systems that can be configured to receive a content asset or a media stream and perform analytics on the content asset or media stream.

The content stream 108 may include, but is not limited to, professionally generated content, digital first content, a live broadcast, a previously stored content asset at a DVR, other broadcasted content, over-the-top (OTT) media stream, video and/or audio files, downloaded content, user-generated content or any media stream, and/or the like. The content deconstruction engine may "slice" the content stream 108 into a plurality of content segments 122a-c at the buffer 120. For example, the content deconstruction engine may determine a starting playback position and an ending playback position for each segment based, on a pre-determined segment duration, e.g., $[t_1, t_2]$, $[t_2, t_3]$, $[t_3, t_4]$, etc. The content segments 122a-c may have the same pre-defined duration lengths or may have different duration lengths. Example lengths for each content segment 122a-c may be pre-defined as 300 ms, 500 ms, 700 ms, and/or the like. Alternatively, the content segments 122a-c may also be defined by chapters, scenes, pauses in audio, close captions, etc., from the content stream 108.

Figure 2:
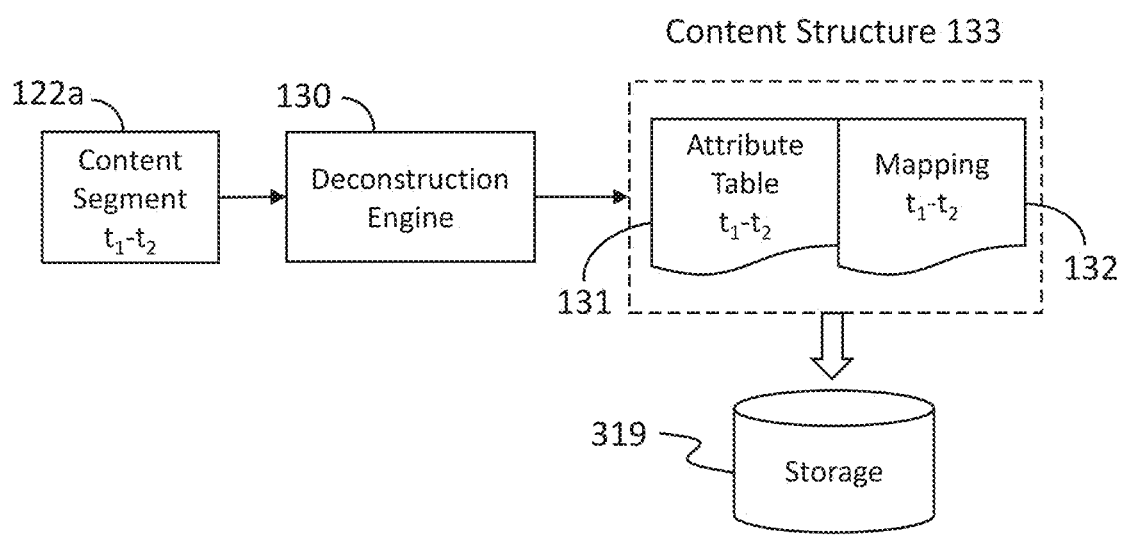
FIG. 2 provides an example block diagram illustrating a deconstruction system for generating a content structure associated with a content segment, according to embodiments described herein.

FIG. 2 provides an example block diagram illustrating a deconstruction system 200 for generating a content structure 133 associated with a content segment (122a as shown in FIG. 1), according to embodiments described herein. Specifically, the content deconstruction engine 130 receives a content segment, e.g., 122a from the pre-processing system 100 in FIG. 1, and may generate a content structure 133 corresponding to the content segment 122a. In some embodiments, the content structure 133 may be generated in real time while the streaming data relating to the content asset 108 is being received. In this case, streaming data from the content stream 108 is buffered at the buffer 120, and then the content deconstruction engine 130 progressively deconstructs each received content segment at the buffer 120 into a content structure 133, while the content stream 108 is also being received at the buffer.

For each determined content segment, e.g., 122a-c, the content deconstruction engine 130 may determine a content structure descriptive of objects and/or other features within the content segment. Specifically, the content deconstruction engine 130 may retrieve and analyze a content segment 122a (or can be any of 122a-c in FIG. 1), e.g., by pattern recognition on video frames contained in the content segment 122a to identify a number of objects, scenes, lighting, audio, etc. For each identified object, scene, lighting, audio, etc., the content deconstruction engine 130 determines a list of attributes for the attribute table 131 descriptive of the respective object, scene, lighting or audio, and corresponding mapping 132 including attribute values corresponding to the attributes.

For example, for a content segment 122a that features a male character and multiple non-human physical objects such as background settings, props, etc., the content deconstruction engine 130 may perform pattern recognition, based on an object database, to identify an object corresponding to the male character from the segment. Based on a type of the object, for example, when the object is a human object, the content deconstruction engine 130 identifies a list of attributes of each human object, including but not limited to gender, race, height, age, hair color, facial feature pattern, clothing style, status (e.g., static, moving, etc.), and other characteristics of the identified object. The content deconstruction engine further obtains specific attribute values, by content analysis of content segment 122a, corresponding to attributes, e.g., such as gender="male," race="Caucasian," height="6," age="28, hair color="brown," status="moving," etc. The attribute values are included in the mapping 132 associated with the attribute table 131.

The attribute table 131 and the associated mapping 132 are stored in the form of a content structure 133 at storage 319. Specifically, the content structure 133 can then be retrieved to create new content by combining with other deconstructed content structures, by replacing part of the mappings 132 with mappings stored in other content structures, or by any mix-matching with attributes or mappings from other content structures, as further described in FIGS. 13A-15. Content structure 133 may be stored as a structured data file compatible with XML, JSON, Python or in the form of other suitable computer readable file.

Storage device 319 may include any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. The content structure 133 including the attribute table 131 and mapping 132 may also be accessed at a cloud-based storage, which may be used to supplement a local storage device or instead of the storage device.

Figure 3A:
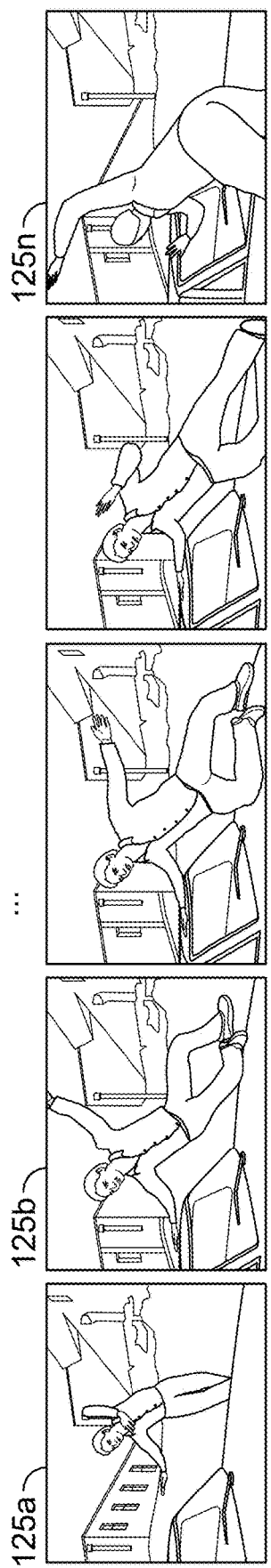
FIGS. 3A-3B provide illustrative diagrams illustrating that objects and the interaction among objects within an example content segment are analyzed frame by frame to generate the content structure, according to some embodiments described herein.
Figure 3B:
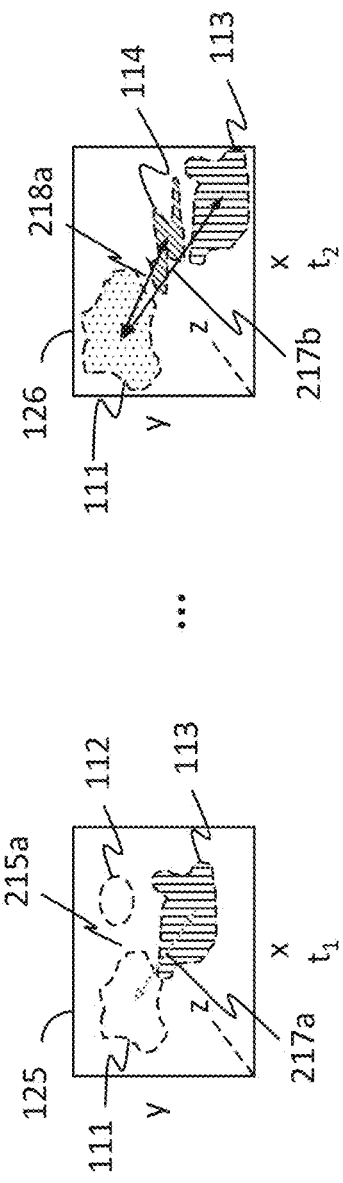

FIGS. 3A-3B provide diagrams illustrating that objects and the interaction among objects within an example content segment 122a are analyzed frame-by-frame to generate the content structure 133, according to some embodiments described herein. FIG. 3A illustrates a series of example consecutive video frames 125a-n deconstructed from content segment 122a, showing the process of a male character jumping over the front of a red car parked by a house. As shown in video frames 125a-n, the relative position between the male character and the red car and the relative position between the male character and the house are changing per frame. The content deconstruction engine 130 analyzes each object within each frame to generate attributes in the attribute table 131 and the associated mapping 132.

Specifically, as shown in FIG. 3B, frames 125 and 126 represent video frames in the content segment 122a at $t_1$ and $t_2$ within content segment 122a, respectively. Within each video frame, the content deconstruction engine 130 identifies various objects, e.g., objects 111, 112, 113 in video frame 125 and objects 111, 113, 114 in video frame 126. For each object, the content deconstruction engine determines a number of attributes such as the type (e.g., human, non-human object name, alien, monster, animation, etc.), state (e.g., new, old, whole, damaged, exploding, liquid, gas, solid) emotional, stoic, etc.), features (e.g., size, height, shape, color, hair color, race, age, gender, attire, etc.), the absolute location (e.g., X, Y and Z coordinates within a 2D or 3D video frame), the relative location (e.g., polar or spherical coordinates relative to another object, etc.), motion (e.g. velocity, movement direction, speed), action (e.g. driving, shooting, chasing, sitting, swimming, singing, etc.) audio (e.g., audio dialogue, background audio, audio volume, audio name, audio instrument type, etc.), and/or the like. Although video frame 125-126 only shows various objects for illustrative purposes, the content deconstruction engine 130 also identifies attributes for lighting (e.g. inside/outside, bright/dark, sunny/cloudy, candlelight/strobe light, season of year, etc.), set information (e.g. domicile, office, war zone, etc.), geographic location (e.g. underwater, space, jungle, mountains, cities, etc.), effects (explosions, smoke, etc.) and filters (e.g. sepia, airbrush, "old film", cartoon, etc.), etc. Additional example of attributes within the attribute table are shown in FIGS. 4 and 5A-D.

In some embodiments, an absolute location attribute (e.g., 136b) is included in the object structure for an object. For example, the content deconstruction engine determines the position point of object 111 as the coordinates (e.g., "$X_1, Y_1, Z_1$" $136b_1$ in mapping 132 for 3D content) of the respective center point of the object. The center point of each object can be obtained by locating the minimum rectangular shape covering the respective object. Deconstruction engine 130 continues to plot the absolute location of object 111 over the course of content segment 122a, as shown for example, in mapping 132 a different set of coordinates "$X_2, Y_2, Z_2$" $136b_2$ is shown when the location of object 111 changes over time.

The content deconstruction engine 130 further determines relative location attributes for objects. For example, as shown in FIG. 5A, object structure 134 includes the relative location attribute 136c for object 112, 113, 114 relative to object 111. The content deconstruction engine may compute a respective set of polar coordinates of the respective position relative to object 111 to describe a respective relative location relationship, e.g., shown at 215a, 217a in frame 125, or 217b and 218a in frame 126. For example, the relative position between the objects 111 and 112 can be described by a vector 215a between the respective center points of the objects 111 and 112, which can be described by polar (2D) or spherical (3D) coordinates ($L_1, \theta_1$) or ($r, \theta, \varphi$) respectively indicative of the vector 215a representing the relationship between the two objects. $L_1$ denotes a relative distance between objects 111 and 112, and $\theta_1$ denotes an angle of the vector from a horizontal axis of the video frame.

The object data structure for object 111 further includes a motion attribute 136e. The content deconstruction engine 130 computes a velocity vector $\vec{V_1}$ $136e_1$ based on the absolute location change ($X_2-X_1, Y_2-Y_1, Z_2-Z_1$) and a time lapse between the video frames, to represent the attribute value corresponding to the motion attribute for object 111. The velocity vector may change with time, which is indicated in the mapping 132 shown in FIG. 4, as a time-varying vector.

In some embodiments, the content deconstruction engine determines a motion of the object by monitoring the relative position change between objects. The content deconstruction engine may retrieve a second video frame (e.g., video frame 126) corresponding to a playback position that is later than the first video frame (e.g., video frame 125), and re-computes a second set of polar coordinates to describe a respective relative location relationship. For example, the content deconstruction engine may compute the relative position between object 111 and object 112 at $t_2$, e.g., described by polar coordinates ($L_2, \theta_2$) indicative of line segment $215_b$ connecting the two objects 111 and 112. $L_2$ denotes a relative distance between objects 111 and 112 within the second video frame 126, and $\theta_2$ denotes an angle of the vector from a horizontal axis of the video frame 126. The content deconstruction engine generates a relative location change vector as the differences between the polar coordinates ($L_1, \theta_1$) and ($L_2, \theta_2$), i.e., ($L_2-L_1, \theta_2-\theta_1$) as shown in mapping 132 as $\vec{V_2}$. Thus, the relative motion attribute (e.g., 136f in FIG. 5A) describing the relative movement of objects 112, 113, 114 relative to object 111 can be computed in a similar manner, which is mapped to a series of velocity vectors $\vec{V}_2, \vec{V}_4, \vec{V}_5, \ldots$ shown at $136f_{1-4}$.

For each attribute, the corresponding attribute value in the mapping 132 may change over time. For example, object 112 appears within frame 125 at $t_1$ but then disappears in frame 126 at $t_2$—meaning attribute values relating to object 112 are not present in the mapping at $t_2$. For another example, the relative location 217a between objects 111 and 112 changes to relative location 217b from frame 125 to frame 126. Thus, the content deconstruction engine 130 further defines each attribute value in the mapping 132 with a respective presence indicator. The presence indicator has a start time and an end time defining the time duration when the specific attribute value is present within the content segment 122a.

Figure 4:
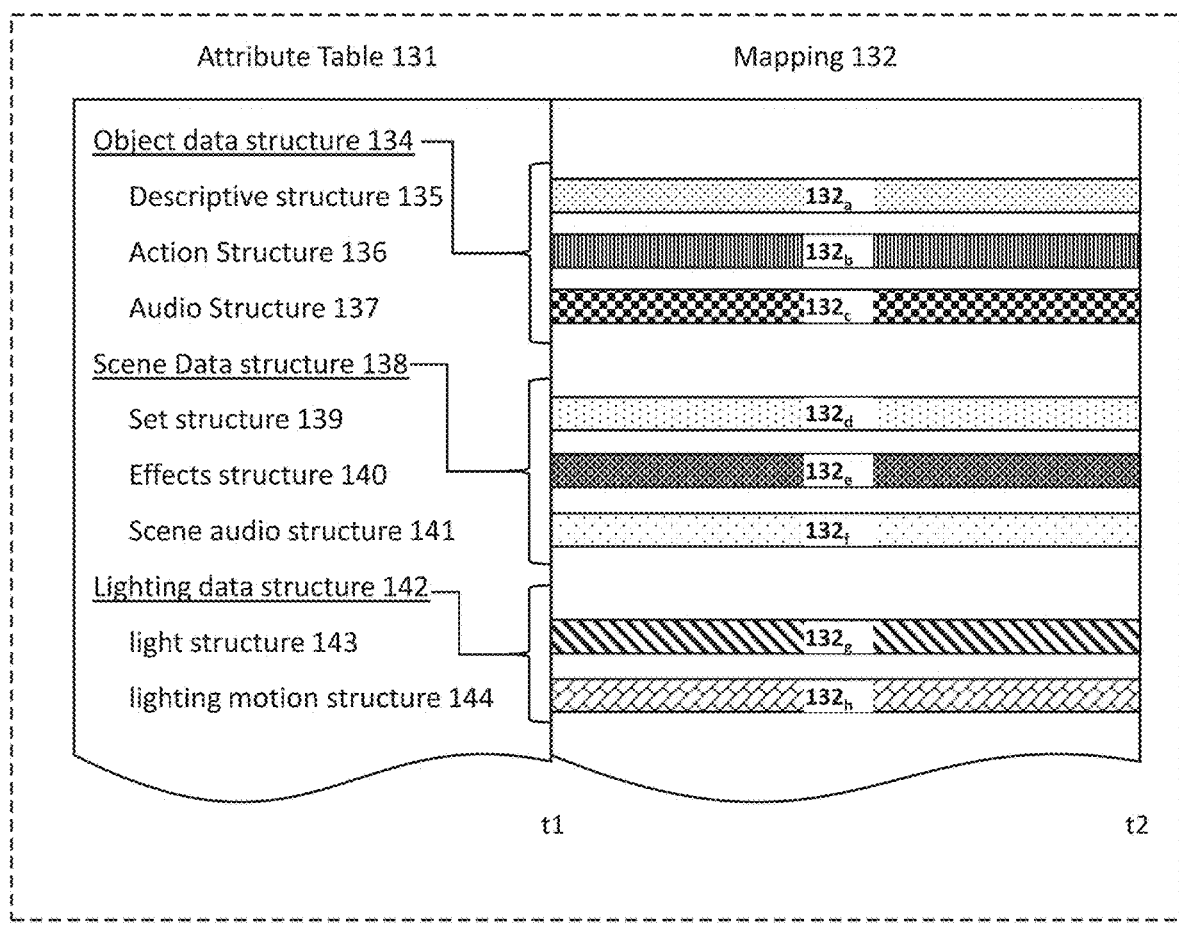
FIGS. 4-5 and 6A-D provide diagrams illustrating an example content structure including an attribute table and associated mapping generated from video frames of the content segment as shown in FIGS. 2-3, according to some embodiments described herein.

FIGS. 4-5 and 6A-D provide diagrams illustrating an example content structure 133 including an attribute table 131 and associated mapping 132 generated from video frames of the content segment 122a as shown in FIGS. 2-3, according to some embodiments described herein. Specifically, FIG. 4 shows content structure 133 includes attribute table 131 listing a number of attributes, and mapping 132 includes attribute values 132a-h corresponding to the attributes, and FIG. 5 further details attributes listed in the attribute table 131. FIGS. 6A-D provides an expanded view of mapping 132 shown in FIGS. 4-5.

Specifically, attribute table 131 may include an object data structure 134 including attributes relating to an object. The object data structure 134 includes a descriptive structure 135, an action structure 136, an audio structure 137, etc., as shown in FIG. 4. As further expanded in FIG. 5, the descriptive structure 135 lists attributes such as object name, object type (e.g., human, vehicle, architecture, animal, etc.), features 135a (e.g.), states 135b, etc. The features 135a and states 135b may include different attributes based on the object type, e.g., age, race, gender, etc. for a human type, or model, year, make, etc. for a vehicle type, etc. The states 135b may include an emotional state (e.g., happy, sad, angry, scared, doubtful, ashamed, etc.), a motion state (e.g., laying down, sitting, sweating, shaking, swimming, flying, sailing, flailing, bleeding, waving, laughing, crying, singing, dancing, spinning, sliding, gliding, shifting, stirring, kicking, punching etc.) for a human type, or a physical state (e.g., intact, decomposed, broken, integrated, splashed, sprinkled, flowing, etc.) for a non-human type, etc.

The action structure 136 is descriptive of actions that the object is performing on or to other objects. The action structure 136 lists action name/type 136a (e.g., shooting, riding, kissing, holding, throwing, cutting, catching, etc.), object(s) that the action involves, absolute location 136b of the object with respect to the video frame, relative location 136c relative to other object(s), absolute motion 136e, relative motion 136f, etc. The location and motion attributes 136b-f are similar to those discussed in relation to FIG. 3B. The mapping 132b corresponding to the action attribute 136a may include a value indicative of a rate or a degree at which the action in taking place (e g, running "slowly," "athletically," "quickly," etc.)

The audio structure 137 contains audio information generated by or associated with an object. For example, audio track 137a may represent dialogue spoken by the object; audio track 137b represents the sound of steps of the object running in the street; and audio track 137c represents the sound of the object crashing into the front of a car. Each audio track 137a-c may further list attributes including audio type, frequency, pitch, melody, volume, lyrics, instrument, voice signature, etc.

FIG. 4 further shows the attribute table 131 includes a scene data structure 138 includes set structure 139, effects structure 140 and scene audio structure 141. As further expanded in FIG. 5, set structure 139 lists attributes of the general set for the content segment, such as setting type 139a, setting features 139b, etc. The setting type 139a may include a time period (e.g., 1930s, medieval, etc.), location (e.g., sunset blvd. in Los Angeles, etc.), or environmental (e.g., bank vault, casino, forest, desert, beach, mountain, ship, war zone, ocean floor, outer-space, etc.).

The effects structure 140 lists attributes of a special effect such as an effect type 140a (e.g., fog, smoke, flash, splash, underwater sunlight, spray, glow, spark, explosion, etc.), features 140b (e.g., color, light smoke, heavy smoke, etc.), effect area 140c (e.g., the location of the effect within the frame), and the associated object that the effect is related to.

The scene audio structure 141 lists attributes relating to various audio or sounds associated with the scene, such as a list of scene audio tracks 141a-n. Each scene audio track 141a-n further includes attributes such as audio type, pitch, frequency, melody, volume, etc. Each scene audio track 141a-n further includes an attribute indicative of allocation the audio is associated with, e.g., a siren is related to the left side of the set, a human yelling voice is related to the right side of the set, etc.

FIG. 4 further shows the attribute table 131 includes a lighting data structure 142, which includes a light structure 143 and lighting motion structure 144. As further expanded in FIG. 5, the light structure 143 includes attributes such as a light source 143a (e.g., sun, a lamp, etc.), light type 143b (e.g., natural light, lamp light, etc.), angle or azimuth 143c, color/hue 143d, saturation 143e. The lighting motion structure 144 lists attributes such as absolute location 144a of illuminated area, location 144b of illuminated area relative to the light source, absolute motion 144c of the illuminated area, motion 144d of the illuminated area relative to the light source, etc.

Figure 5:
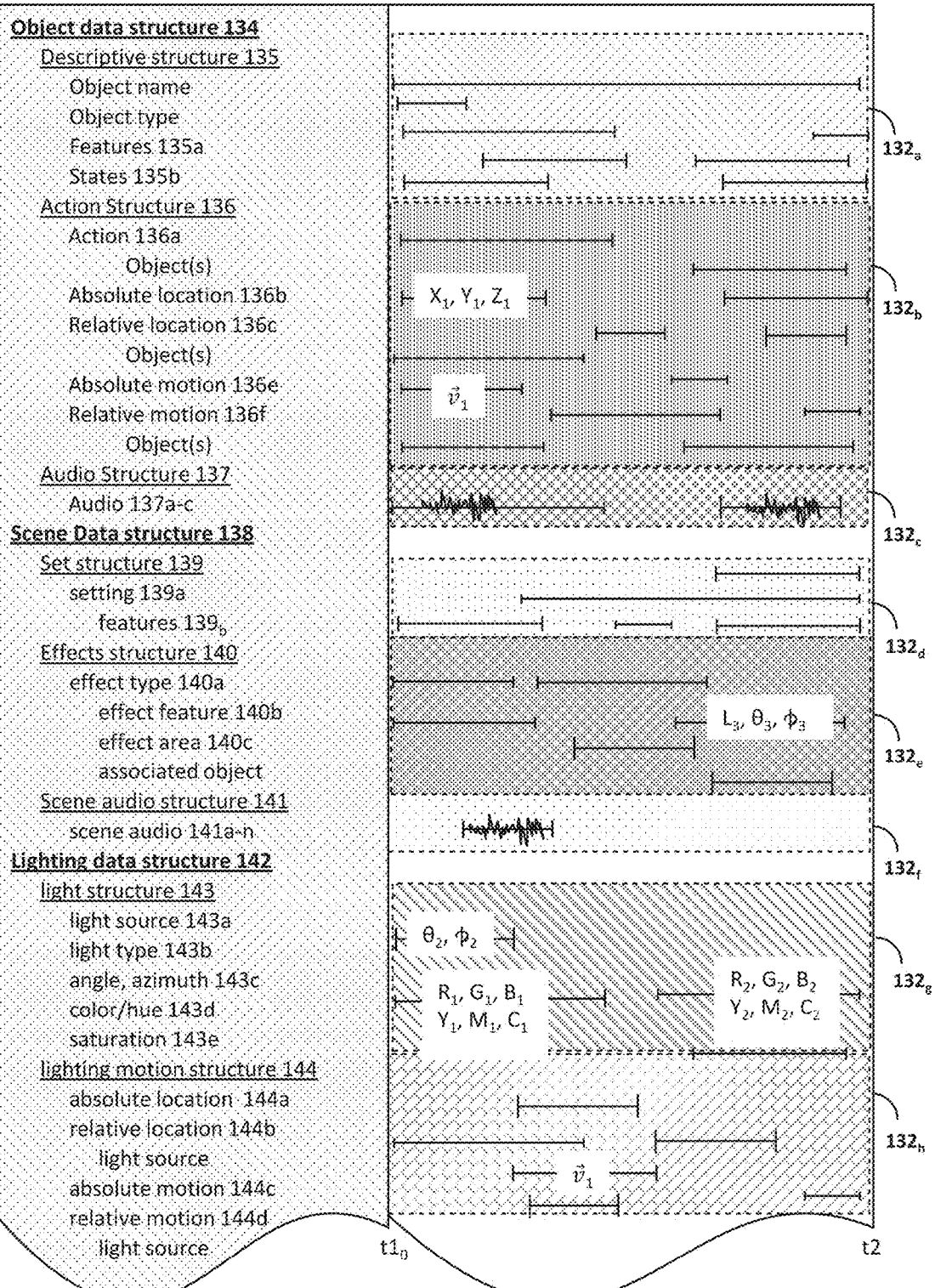
Figure 6A:
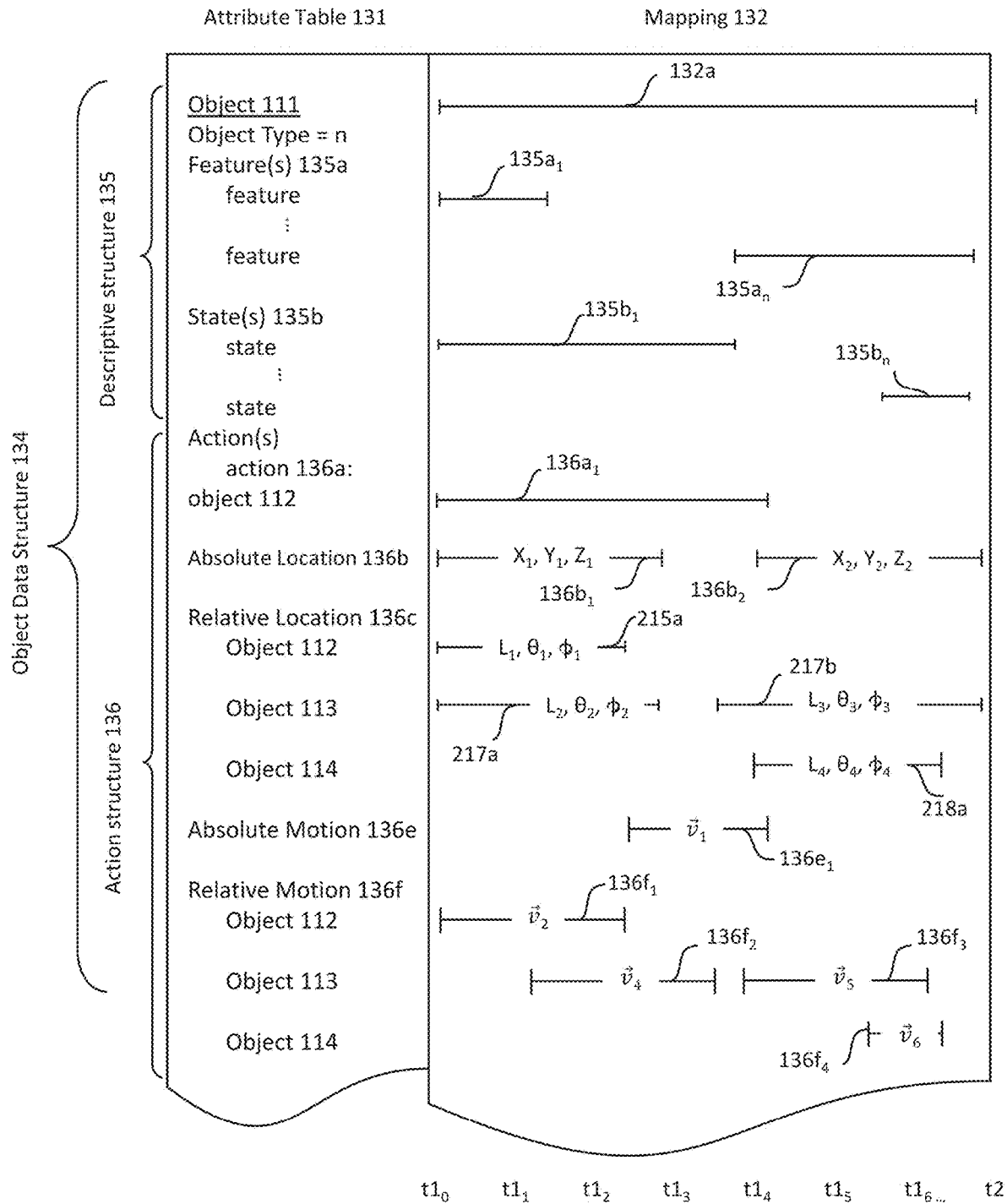
Figure 6B:
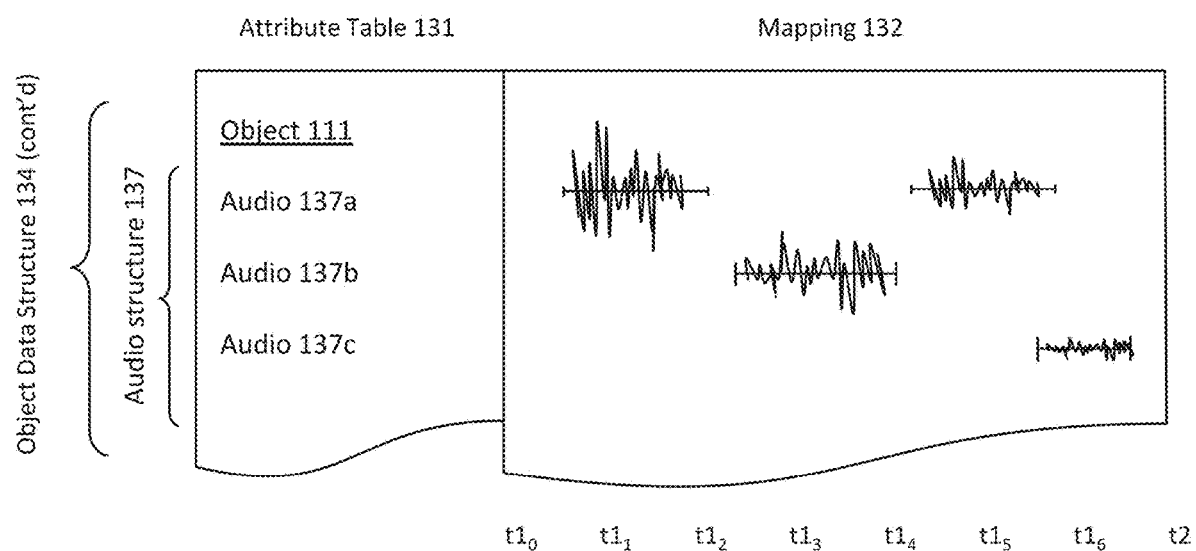
Figure 6C:
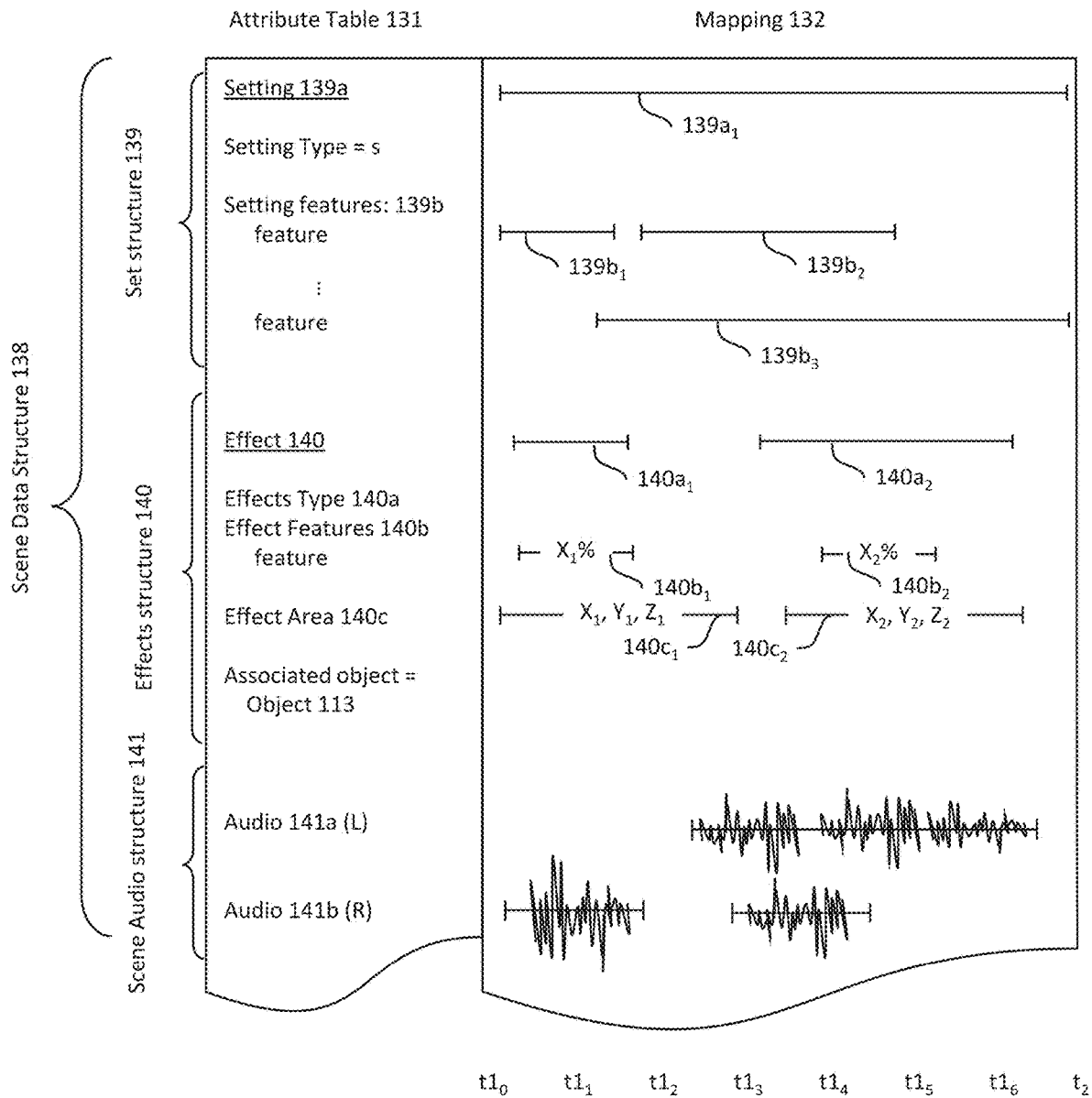
Figure 6D:
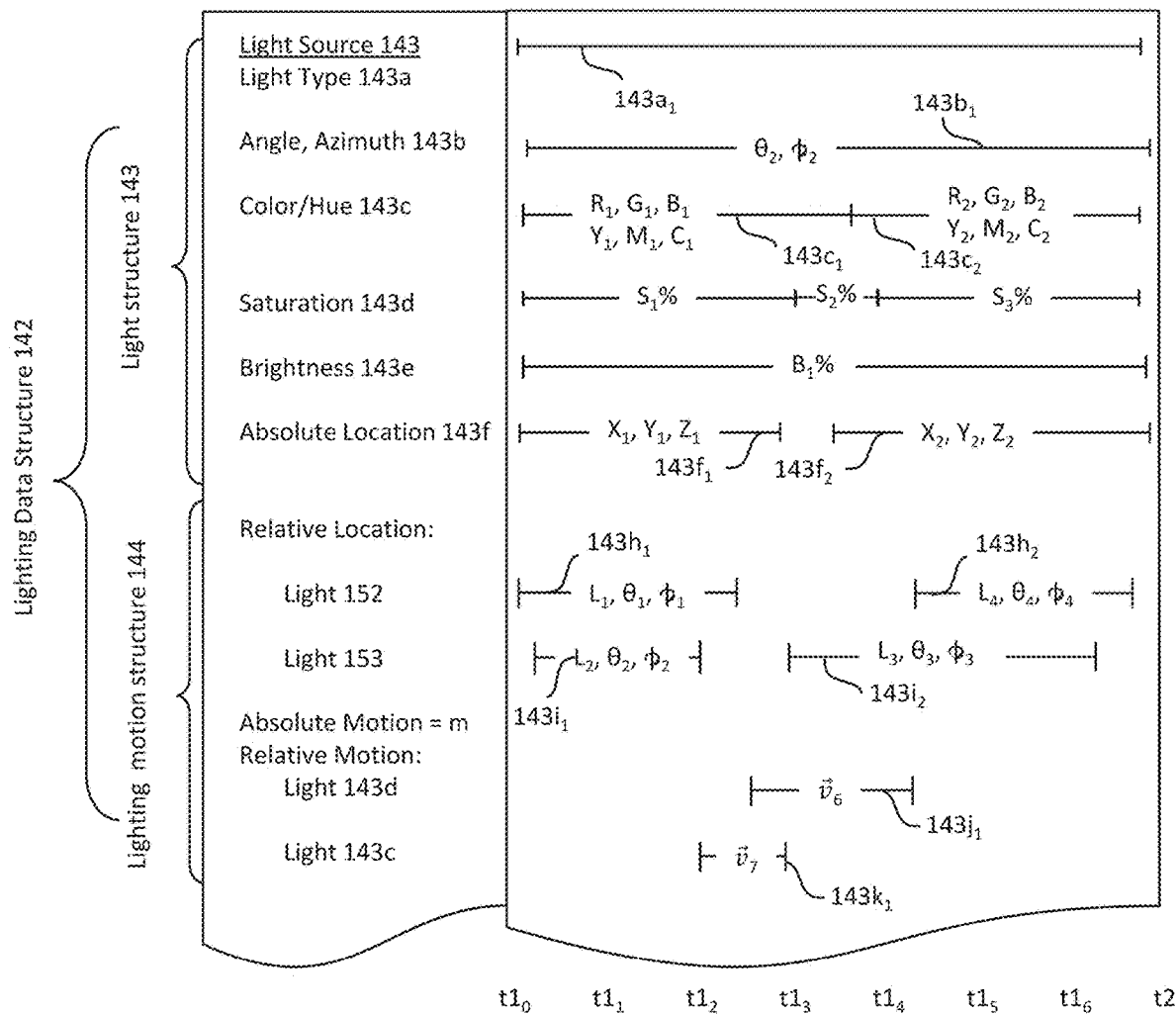

FIGS. 4-5 further show mappings 132a-h include attribute values corresponding to the attributes in the attribute table 131. The attribute values may take different data formats, e.g., a numeric value, a percentage, a descriptor, etc. For example, at mapping 132a, the attribute value corresponding to object type can be "human," "vehicle," "animal," etc. At mapping 132b, the attribute value corresponding to absolute location attribute 136b is the coordinates $(X_1, Y_1, Z_1)$. At mapping 132g, the attribute value corresponding to color 143d can be the red, green and blue parameters (of the lighting). Each attribute value is bounded by a time duration defined by the presence indicator, as illustrated by the various line segments shown at mappings 132a-h.

FIGS. 6A-D provide an expanded view of content structure 133 shown in FIGS. 4-5. Specifically, the duration of the content segment 122a between $t_1$ and $t_2$ is divided into smaller time units such as $t1_0, t1_1, t1_2, \ldots t1_n, \ldots t2$. Every mapping corresponding to a specific attribute value is then associated with the presence indicator that has a start time and an end time chosen from $t1_0, t1_1, t1_2, \ldots t1_n, \ldots t2$.

For example, feature mappings (e.g., "Caucasian," "male," "28 years old," "brown hair," "red shirt," etc.) $135a_{1-n}$ may be bounded by the time duration when object 111 appears in content segment 122a. State mappings (e.g., "angry," "tense," "running," "jumping," etc.) $135b_{1-n}$ may each be bounded by the time when the actual state appears, e.g., state="running" between $t1_0$ and $t1_x$, and then changes to "jumping" between $t_1$ and $t1_y$.

Similarly, mapping 132 further shows action mapping $136a_1$, absolute location mappings $136b_{1-2}$, relative location mappings 215a, 217a, 217b and 218a, absolute motion mapping $136e_1$, relative motion mapping $136f_{1-4}$ (as also discussed in relation to FIG. 3B), setting mappings $139a_1$, setting feature mappings $139b_{1-3}$, effects type mappings $140a_{1-2}$, effects feature mappings $140b_{1-2}$, effect area mappings $140c_{1-2}$, light type mapping $143a_{1-2}$, angle mapping $143b_1$, color mapping $143c_{1-2}$, saturation mapping, absolute location mappings $143f_{1-2}$, relative location mappings $143h_{1-2}$ and $143i_{1-2}$, absolute motion of light mapping $143j_1$, relative motion of light mapping $143k_1$, etc. Each mapping is represented by a line segment indicative of the time duration that the specific mapping is present in content segment 122a.

Figure 7:
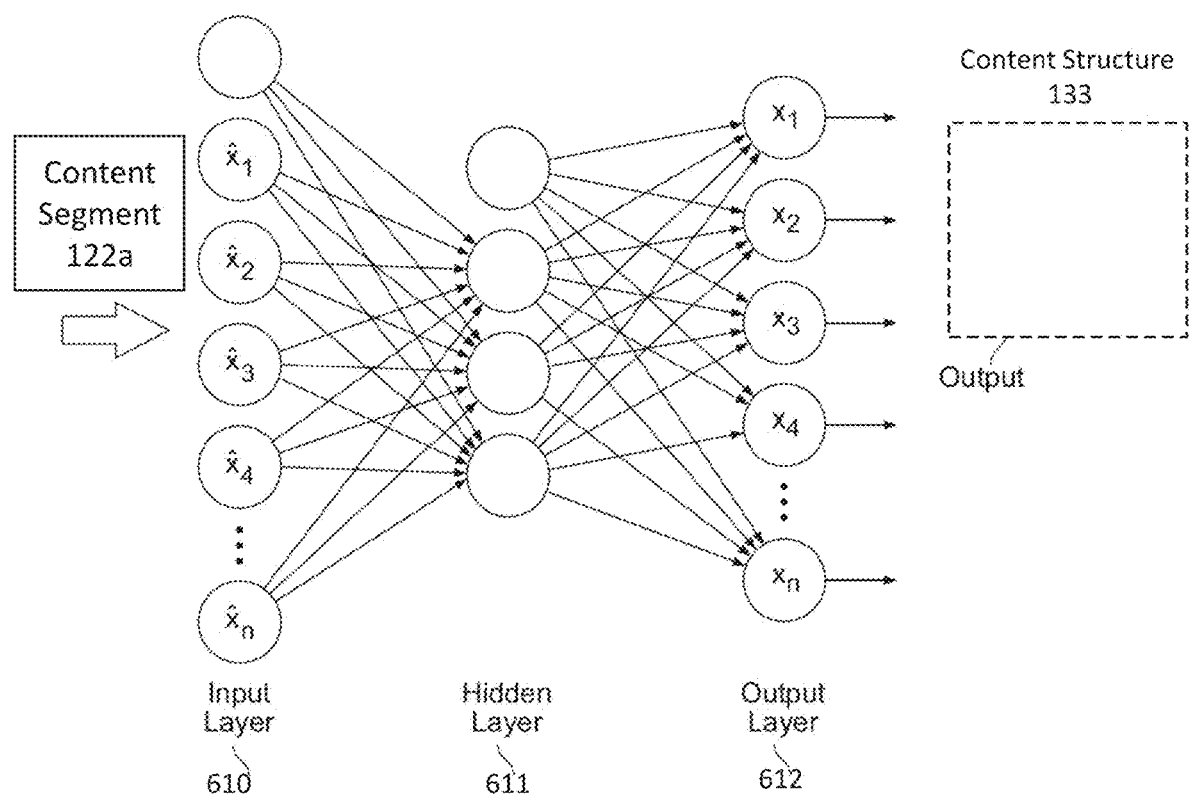
FIG. 7 provides an example diagram illustrating the process of training and generating content structure via an artificial neural network, according to some embodiments described herein.
Figure 8:
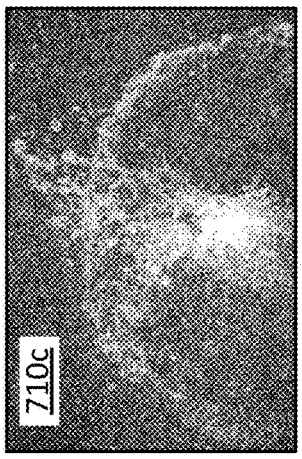
FIG. 8 provides example training sets for object/scene/effect identification for the artificial neural network illustrated in FIG. 7.
Figure 8:
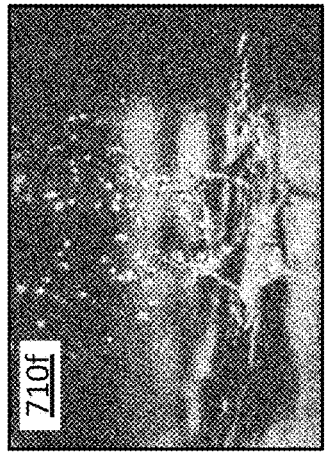
Figure 8:
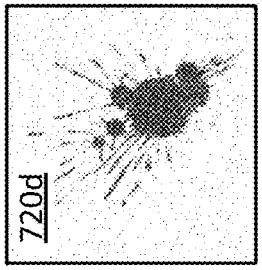
Figure 8:
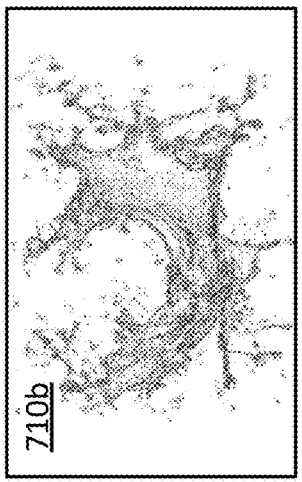
Figure 8:
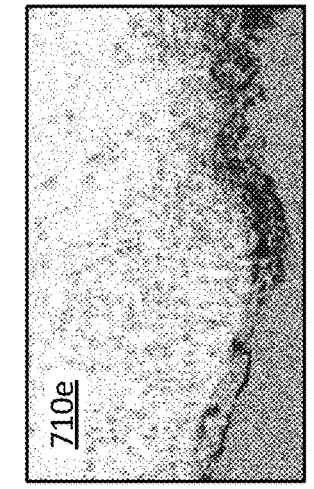
Figure 8:
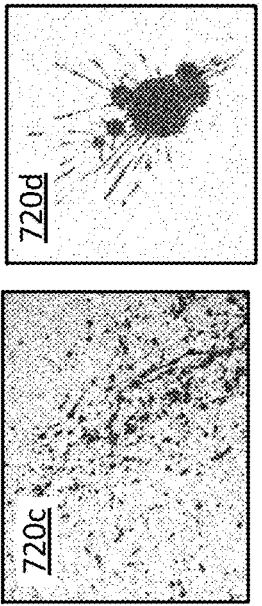
Figure 8:
Figure 8:
Figure 8:
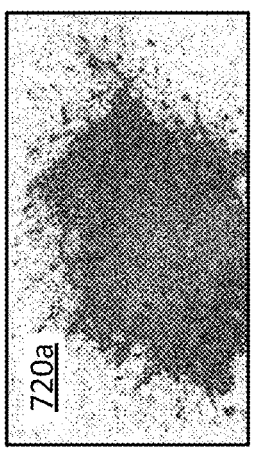

FIG. 7 provides an example diagram illustrating the process of training and generating content structure 133 via an artificial neural network, according to some embodiments described herein. An artificial neural network may be trained to recognize objects, scenes, audios, settings, effects, etc., from a content segment. Content segment 122a can then be fed to the input layer 610 of the artificial neural network. For example, various visual representations may indicate the same type of object, scene, etc. As shown in FIG. 8, the effect "water splash" 710a-f or "blood splatter" 720a-d may share a common pattern, but each has different visualization. The artificial neural network may be trained to identify the common pattern from different visualizations via processing at one or more hidden layers 611. Thus, by identifying objects, scenes, audios, settings, effects, etc., from the content segment, an output of the content structure 133 is generated at the output layer 612. Further details relating to identifying objects from a content segment are provided in co-pending and commonly assigned U.S. nonprovisional application Ser. No. 16/216,275, filed on Dec. 11, 2018, which is hereby expressly incorporated by reference herein in its entirety.

FIG. 8 provides example training sets for object/scene/effect identification for the artificial neural network illustrated in FIG. 6. For example, a number of images, videos, etc. 710a-f showing different kinds of "water splash" can be used to train the artificial neural network to identify the effect of "water splash" 710 from a content segment. For another example, a number of images, videos, etc. 720a-d showing different kinds of "blood splatter" can be used to train the artificial neural network to identify the effect of "blood splatter" 720 from a content segment.

FIGS. 9A-B provide pseudo-code examples of content structure 133 illustrated in FIGS. 4-5 and 6A-D, according to some embodiments described herein. Content structure 133 may be stored in a structured data format compatible with XML, JSON, Python, etc. For example, FIG. 9A shows an example segment of attribute table 131 that lists a hierarchical structure of data fields for the attribute table 131, under which object data structure 134 is listed, under which the description structure 135 is listed, under which an object 111 is listed, under which a number of features of the object 111 are listed, and so on.

FIG. 9B shows an example segment of mapping 132. For example, mapping 132 specifies the object identifier for object 111, and the presence indicator of a time duration "0:00-00:11" during which object 111 is present within the content segment 122a. Mapping 132 also specifies a mapping for the object state attribute, e.g., [0.00:00-00:02, 27] indicates a state of code "0" (e.g., referring to the state of "determined") having a degree of "27" (e.g., 27 out of 100, referring to "moderately determined") during the time duration "00:00-00:02." The state mapping may change to [1, 00:02-00:05, 35], which indicates a state of code "1" (e.g., referring to the state of "intense") having a degree of "35" (e.g., 35 out of 100 level of "intense") during time duration "00:02-00:05," and so on.

In another example, mapping 132 includes mappings for the absolute or relative locations, the absolute or relative motions of object 111, as discussed in relation to FIGS. 3A-B. As shown in FIG. 9B, the absolute location mapping [00:00-00:02, (11.34, 23.34, 23.87)] indicates the location at the 3-D coordinates (11.34, 23.34, 23.87) during time "00:00-00:02." The absolute location mapping may change to [00:02-00:07, (12.02, 21.23, 05.67)], indicating the location of object 111 changes to the location at coordinates (12.02, 21.23, 05.67) during time "00:02-00:07," and so on. The relative location mapping [112, 00:00-00:02, (2.7, 30°)] indicates a relative location at polar coordinates (2.7, 30°) relative to object 112 during the time "00:00-00:02," and so on. The absolute motion mapping $[00{:}00{-}00{:}02, (\vec{v}1)]$ indicates a motion vector $\vec{v}1$ during the time "00:00-00:02," and so on. The relative motion mapping $[112, 00{:}00{-}00{:}02, (\vec{v}4)]$ indicates a relative motion vector $\vec{v}4$ relative to object 112 during the time "00:00-00:02," and so on.

Another content structure 133 taking a form similar to XML is provided below:

```
<content_structure>
<attribute table>
<object>
   <object_id> 111 </object_id>
   <type> human </type>
      <feature>
         <gender> male </gender>
         <age> 28 </age>
         <height> 6' </height>
         <hair_color> brown hair </hair_color>
         <race> Caucasian </race>
         <attire> check shirt </attire>
         . . .
      </feature>
      <state>
         <emotion> determined, intense </emotion>
         . . .
      </state>
      . . .
</attribute_table>
<object_map>
   <object_map_ID> map 132 </object_map_ID>
<start_time>00:00 </start_time>
<end_time> 00:10 </end_time>
   <object_ID> object 111 </object_ID>
<location>
   <absolute location>
   <x_coordinate> 12344.34 </x_coordinate>
   <y_coordinate> 4234.45 </y_coordinate>
   </absolute location>
   <relative_location>
      <relative_object_id> 112 </relative_object_id>
      <relative_distance> 12 </relative_distance>
      <relative_angle> 23° </relative_angle>
      . . .
   </relative_location>
<start_time>00:10 </start_time>
<end_time> 00:15 </end_time>
```

```
<absolute location>
<x_coordinate> 16342.56 </x_coordinate>
<y_coordinate> 3234.48 </y_coordinate>
</absolute location>
<relative_location>
   <relative_object_id> 112 </relative_object_id>
   <relative_distance> 90 </relative_distance>
   <relative_angle> 47° </relative_angle>
   . . .
</relative_location>
. . .
</location>
<motion>
   <start_time>00:00 </start_time>
   <end_time> 00:10 </end_time>
<velocity> 10 mph, 53°, 260° </velocity>
<relative motion>
   <relative_object_id>    112    </relative_object_id>
      <velocity> 1 mph, 5°, 2°
</velocity>
</relative motion>
   . . .
</motion>
<audio>
<start_time>00:00 </start_time>
<end_time> 00:10 </end_time>
   <audio_object_ID> audio_111 </audio_object_ID>
   <dialogue> "Come on" </dialogue>
   <background_audio> instrumental </background_audio>
      . . .
   </audio>
. . .
</object_map>
<object> . . . </object>
. . .
</content_structure>
```
For another example, for a physical object such as a car, attributes in the object data structure may be hierarchical, including object, object type, object sub-type, object name, make and model, color, etc., and the corresponding mapping may include "non-human object," "vehicle," "automobile," "car," "BMW," "SUV X5," "red," and/or the like.

Figure 10:
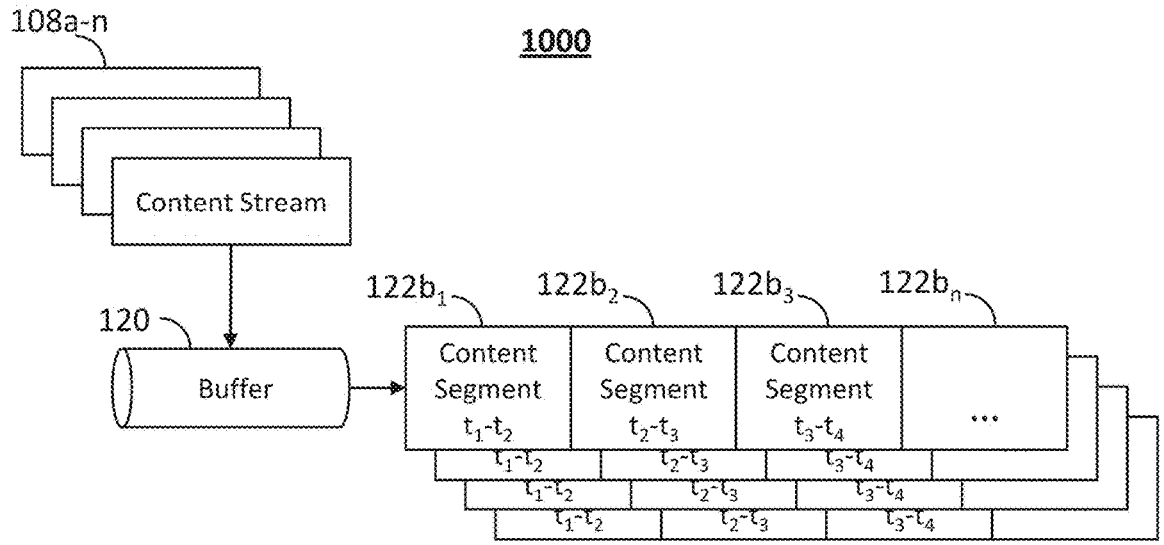
FIGS. 10-11 provide example diagrams illustrating the content deconstruction engine processing a number of content streams to generate a number of content structures, according to some embodiments described herein.
Figure 11:
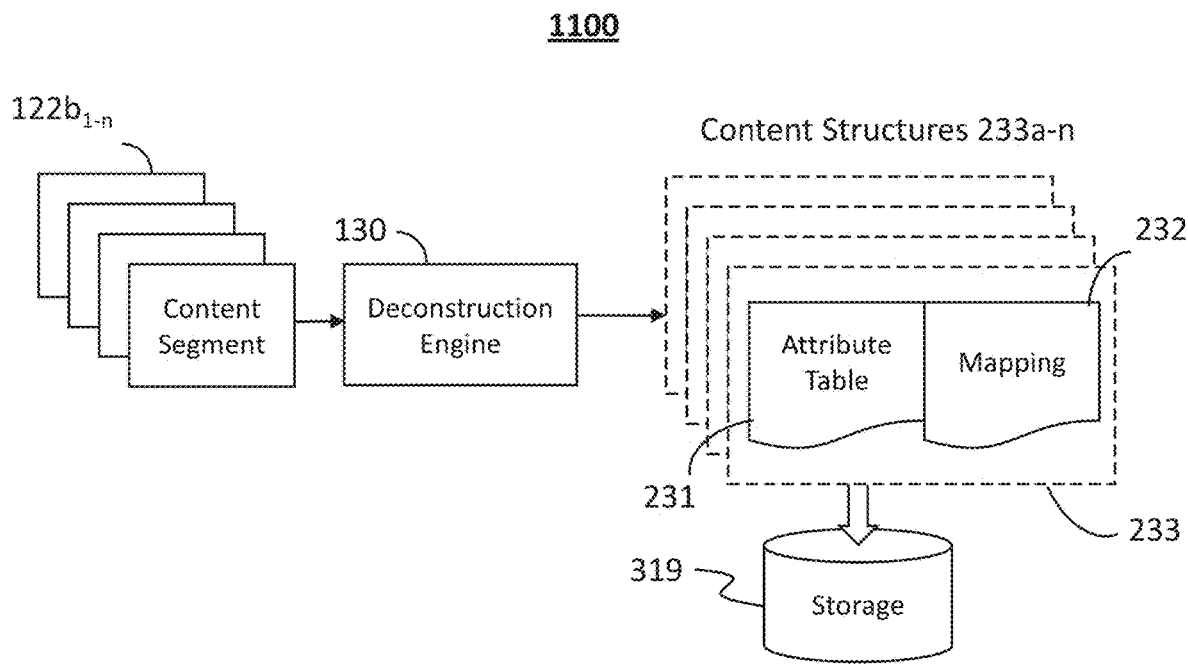

FIGS. 10-11 provide example diagrams illustrating the content deconstruction engine 130 processing a number of content streams 108*a-n* to generate a number of content structures, according to some embodiments described herein. For example, FIG. 10 shows a pre-processing system 1000 that is similar to the pre-processing system 100 in FIG. 1, but a number of content streams 108*a-n* are fed to the buffer 120, e.g., in a parallel input structure. Each content stream 108*a-n* is then deconstructed into a respective number of content segments. Depending on the content stream, different content streams may be deconstructed into content segments in different manners. For example, content stream 108*a* may be deconstructed into content segments 108*a*₁₋ₙ, each having a defined length (e.g., 10 ms, etc.), while content stream 108*b* may be deconstructed into content segments 122*b*₁₋ₙ by identifying the change of scenes in content stream 108*b*.

The deconstructed content segments 122*a*₁₋ₙ, 122*b*₁₋ₙ, . . . are then fed to the content deconstruction engine 130 as shown in diagram 1100 in FIG. 11. The content deconstruction engine 130 may deconstruct each content segment 122*a*₁₋ₙ, 122*b*₁₋ₙ . . . into a content structure 233*a-n* for storage at 319. For example, each content structure 233 would be similar to content structure 133 discussed throughout 1-9, e.g., including an attribute table 231 and the mapping 232.

The content structures 233*a-n* may be generated in a distributive manner at distributed processors, in parallel by parallel processors, or in any other processing orders. The content structures 233*a-n* may be stored in database 319 either together collectively, or may be stored separately at distributed servers for later retrieval to construct new content.

Figure 12:
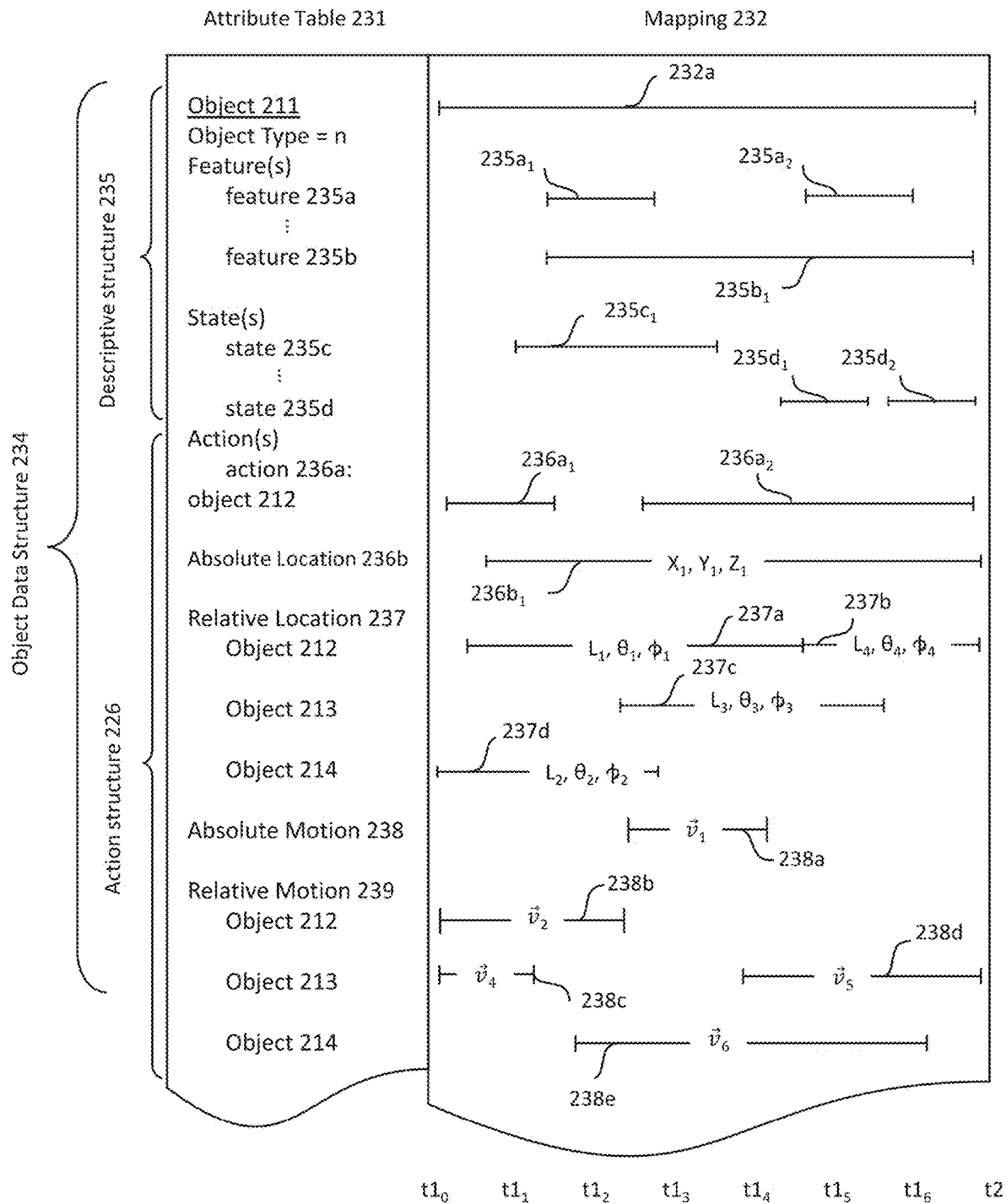
FIG. 12 shows another example of content structure in a similar format as those shown in FIGS. 4-5 and 6A-D.

FIG. 12 shows another example of content structure 233 having the attribute table 231 and mapping 232. Content structure 233 may take a form similar to content structure 133 as shown in FIGS. 4-5 and 6A-D, having the attribute table 231 and mapping 232. The attribute table 231 lists object data structure 234 including the action structure 226 and descriptive structure 235, each including a number of attributes such as object features 235*a-b*, states 235*c-d*, action absolute location 236*b*, relative location 237, absolute motion 238, relative motion 239, etc. The mapping 232 is illustrated by various line segments, indicating each mapping is bounded by a time duration during which the corresponding attribute value indicated by the respective mapping is present within the content segment. Attribute mappings 232*a*, 235*a*₁₋ₙ, 235*b*₁, 235*c*₁, 235*d*₁₋₂, 236*a*₁₋₂, 236*b*₁, 237*a-d*, 238*a-e* shown at mapping 232 may be defined in a similar manner as discussed in relation to mapping 132 of FIGS. 6A-D.

Figure 13A:
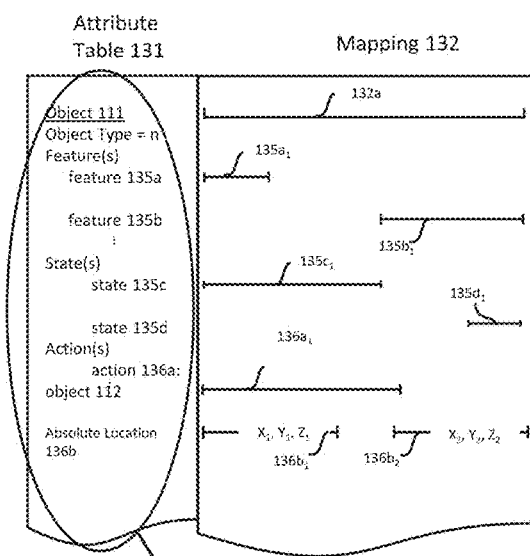
FIGS. 13A-15 provide example diagrams illustrating aspects of creating new content from previously created and stored content structures discussed throughout FIGS. 1-12.
Figure 13A:
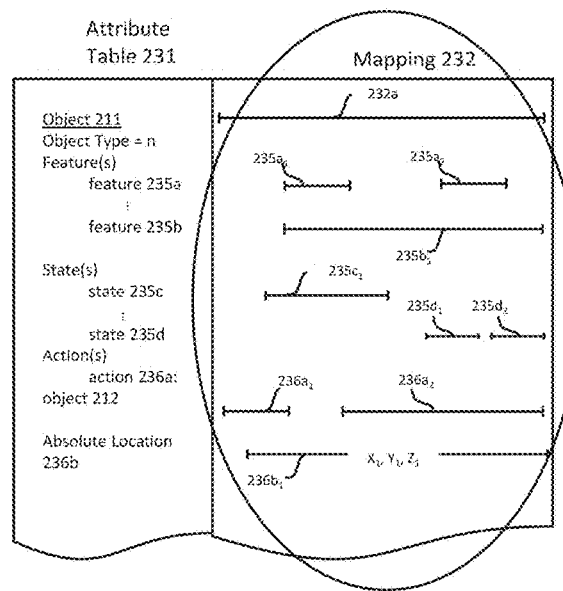
Figure 13A:
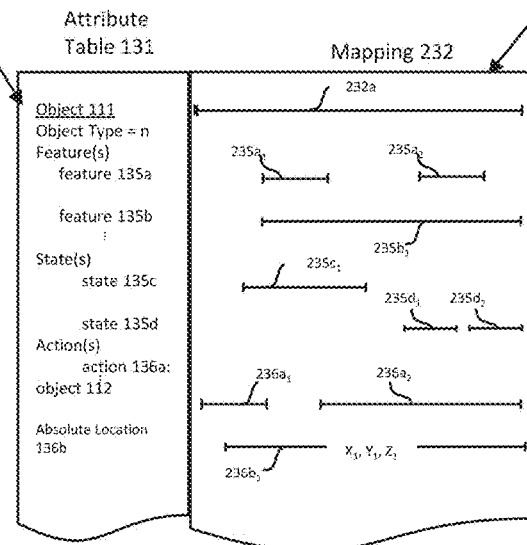
Figure 13B:
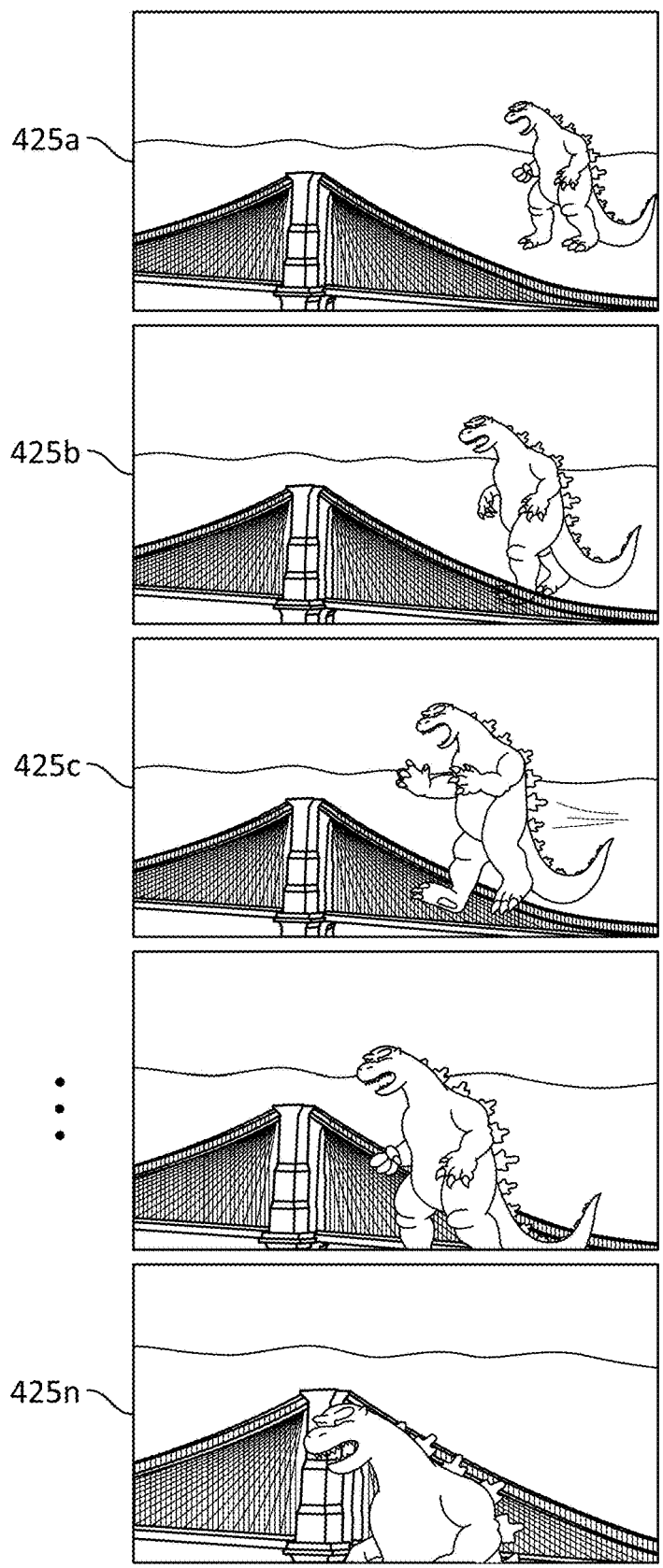
Figure 14:
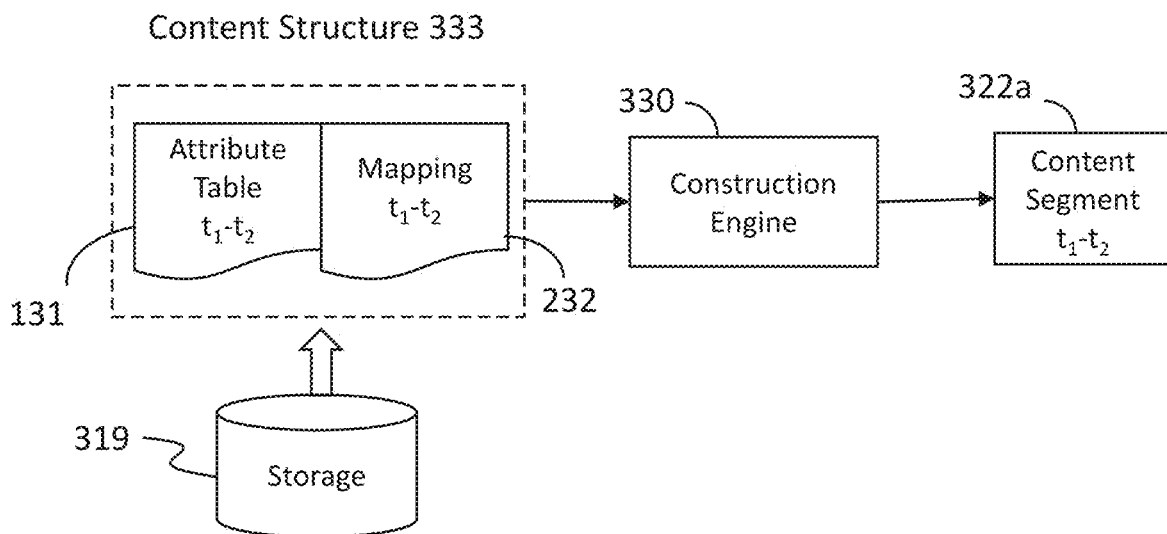

FIGS. 13A-14 provide example diagrams illustrating aspects of creating new content from previously created and stored content structures discussed throughout FIGS. 1-12. Specifically, FIG. 13A shows generating a new content structure 333 based on previously created and stored content structures 133 shown in FIGS. 4-5 and content structure 233 shown in FIG. 11. For example, the mapping 132 in content structure 133 may be modified or replaced by mapping 232 from content structure 233.

In this way, attributes of the object data structure for object 111 are assigned new attribute values from mapping 232, which can change the appearance, state, movement, etc., of the original object 111 to result in a new object. For example, in content structure 133, object feature attributes in attribute table 131, such as race, age, gender, height, skin tone, hair color, eye color, etc., are mapped to attribute values in mapping 132 such as "Caucasian," "28 years old," "male," "6 feet," "tanned," "brown hair," "hazel eyes," etc. In content structure 233, object feature attributes in attribute table 231, such as species, age, gender, height, skin tone, hair color, eye color, etc., are mapped to "undefined creature," "mature," "male," "56 feet," "lizard green," "no hair," "black eyes," etc. By mix-matching mapping 232 with attribute table 131, the new content structure 333 has the object data structure for object 111 being mapped to attribute values "undefined creature," "mature," "male," "56 feet," "lizard green," "no hair," "black eyes," etc.

As shown in FIG. 13A, attributes such as actions, absolute locations, etc., in the attribute table 131 are assigned to relevant attribute values from mapping 232. For example, the action is changed from "(running, upright on two limbs)" to "(lumbering, on two limbs and tail)." The absolute location can be changed to a set of new coordinates that fit the size and shape of the monster creature. The motion can be changed to the motion vectors indicative of the speed and motion pattern of the monster creature. Thus, in the new content structure 333, the original object 111, which is indicative of a Caucasian male character running and jumping (e.g., as shown in FIG. 3A), is modified to indicate a monster creature that has lizard skin lumbering heavily.

Similarly, another object structure (e.g., indicative of the red car shown in video frames 125a-n in FIG. 3A) in content structure 133 can be mapped to attribute values depicting a bridge-tower architecture, which may be obtained from another content structure (e.g., different from 133 or 233). The setting mappings corresponding to setting attributes in attribute table 131 can be replaced by setting mappings from another different, previously stored content structure (e.g., different from content structures 133 or 233). For example, the setting mappings in mappings 132, which are indicative of "Sunset Blvd, Los Angeles," can be changed to "Brooklyn bridge, New York." The lighting mappings corresponding to lighting attributes in attribute table 131 can be replaced by lighting mappings from yet another previously stored content structure, e.g., to change the lighting mapping from daylight to a night pattern, and so on. The new content structure 333 is then indicative of a monster creature that has lizard skin lumbering heavily on the Brooklyn Bridge and crashing into the bridge tower (e.g., as illustrated in video frames 425a-n in FIG. 13B).

Thus, by mix-matching a number of previously stored content structures, new content structure 333 is created, which can be used to reconstruct new content showing a monster creature crashing into the Brooklyn Bridge in New York. The content generation process requires little production cost without expensive setting, filming or computer editing that is usually required for content creation of the science fiction genre.

The new content structure 333 shown in FIG. 13A may be generated by user selection. For example, the content construction engine 330 may provide a drag-and-drop feature in a user interface such that a user can drag the new mapping 232 into the content structure 133 to replace mapping 132 via the user interface. Or a user may program and edit the content structure 133, e.g., by editing attribute values in mapping 132, etc. Alternatively, in another implementation, a content construction engine may be implemented to automatically combining, replacing or mix-matching a previously stored content structure upon indication of an object, scene, effect, etc., to be replaced. In the respective example in FIG. 13A, a user may select the object 211 (e.g., the "monster" object) described by content structure 233 via a user interface to indicate that the object 111 (e.g., the "male" object) is to be replaced. The content construction engine 330 may then populate the attributes corresponding to object 111 in attribute table 131 with attribute values corresponding to object 211 from mapping 132, as illustrated in FIG. 13A.

In some embodiments, the content construction engine may automatically determine which mappings from mapping 232 of the content structure 233 can be used to customize object 111 in content structure 133. For example, the content construction engine determines a list of attributes for object 111 that need to be populated or customized, e.g., attributes depicting the physical appearance and movement patterns. The content construction engine may then obtain attribute values from the customized mapping 232 that depict the physical appearance and movement patterns of a monster creature to populate attributes relating to object 111 in content structure 133.

FIG. 14 provides an example block diagram illustrating constructing a new content segment based on the new content structure 333 shown in FIG. 13A, according to embodiments described herein. Content construction system 1400 shows a content construction engine 330, which may be implemented together with, or separately from, the content deconstruction engine 130, which retrieves the new content structure 333 from storage device 319, and then converts the content structure 333 into content segment 322a. The conversion may be done by computer rendering algorithms to render video frames 425a-n as shown in FIG. 13B based on structured data from the new content structure 333. The video frames 425a-n are then combined sequentially and consecutively to output content segment 322a.

Figure 15:
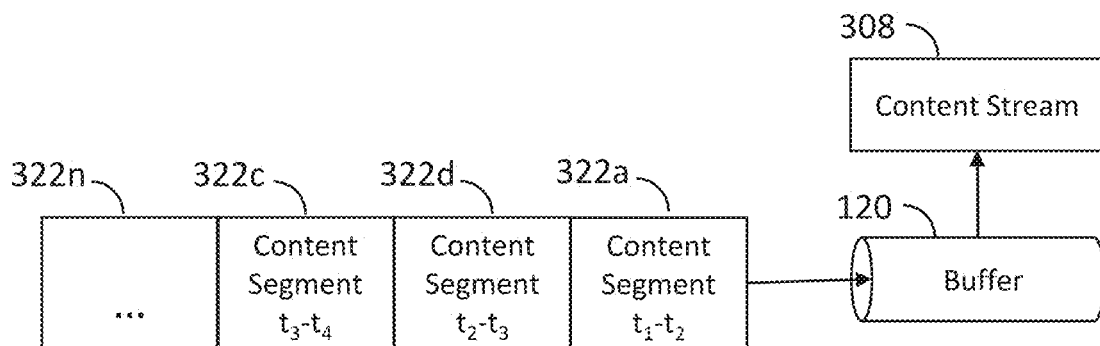

FIG. 15 provides an example block diagram 1500 illustrating constructing a new content stream based on various new content segments as generated in FIG. 14, according to embodiments described herein. New content segments 322a-n may be generated in parallel, in sequence or at distributed processors of the content construction engine 330 and stored at buffer 120. The buffered content segments 322a-n at the buffer 120 may be concatenated in a time-sequential manner to form a new content stream 308.

The content deconstruction engine 130 and/or the content construction engine 330 described throughout FIGS. 1-15 may be implemented using any suitable architecture. For example, the content deconstruction engine and/or the content construction engine may be a stand-alone application wholly implemented on a computer device. In such an approach, instructions of the content deconstruction engine and/or the content construction engine are stored locally (e.g., in storage 319 in FIG. 2), and data for use by the engine may also be stored locally and/or downloaded on a periodic basis (e.g., from an out-of-band feed, from an Internet resource, or using another suitable approach). Control circuitry may be used to retrieve instructions of the content deconstruction engine and/or the content construction engine from storage and process the instructions to generate any of the content structures discussed herein. Based on the processed instructions, control circuitry may determine what action to perform when input is received.

In some embodiments, the content deconstruction engine and/or the content construction engine is a client server-based application. Data for use by a thick or thin client implemented on a computer device is retrieved on-demand by issuing requests to a server remote to the computer device. In one example of a client server-based content deconstruction engine and/or content construction engine, control circuitry processes instructions provided by a remote server. For example, the remote server may store the instructions for the application in a storage device.

In some embodiments, the content deconstruction engine and/or the content construction engine is downloaded and interpreted or otherwise run by an interpreter or virtual machine (run by control circuitry). In some embodiments, the content deconstruction engine and/or the content construction engine may be encoded in the ETV Binary Interchange Format (EBIF), received by control circuitry as part of a suitable feed, and interpreted by a user agent running on control circuitry. For example, the content deconstruction engine and/or the content construction engine may include an EBIF application. In some embodiments, the content deconstruction engine and/or the content construction engine may be defined by a series of JAVA-based or JSON based files that are received and run by a local virtual machine or other suitable middleware executed. In some of such embodiments (e.g., those employing MPEG-2 or other digital media encoding schemes), the content deconstruction engine and/or the content construction engine may be, for example, encoded and transmitted in an MPEG-2 object carousel with the MPEG audio and video packets of a program.

Figure 16:
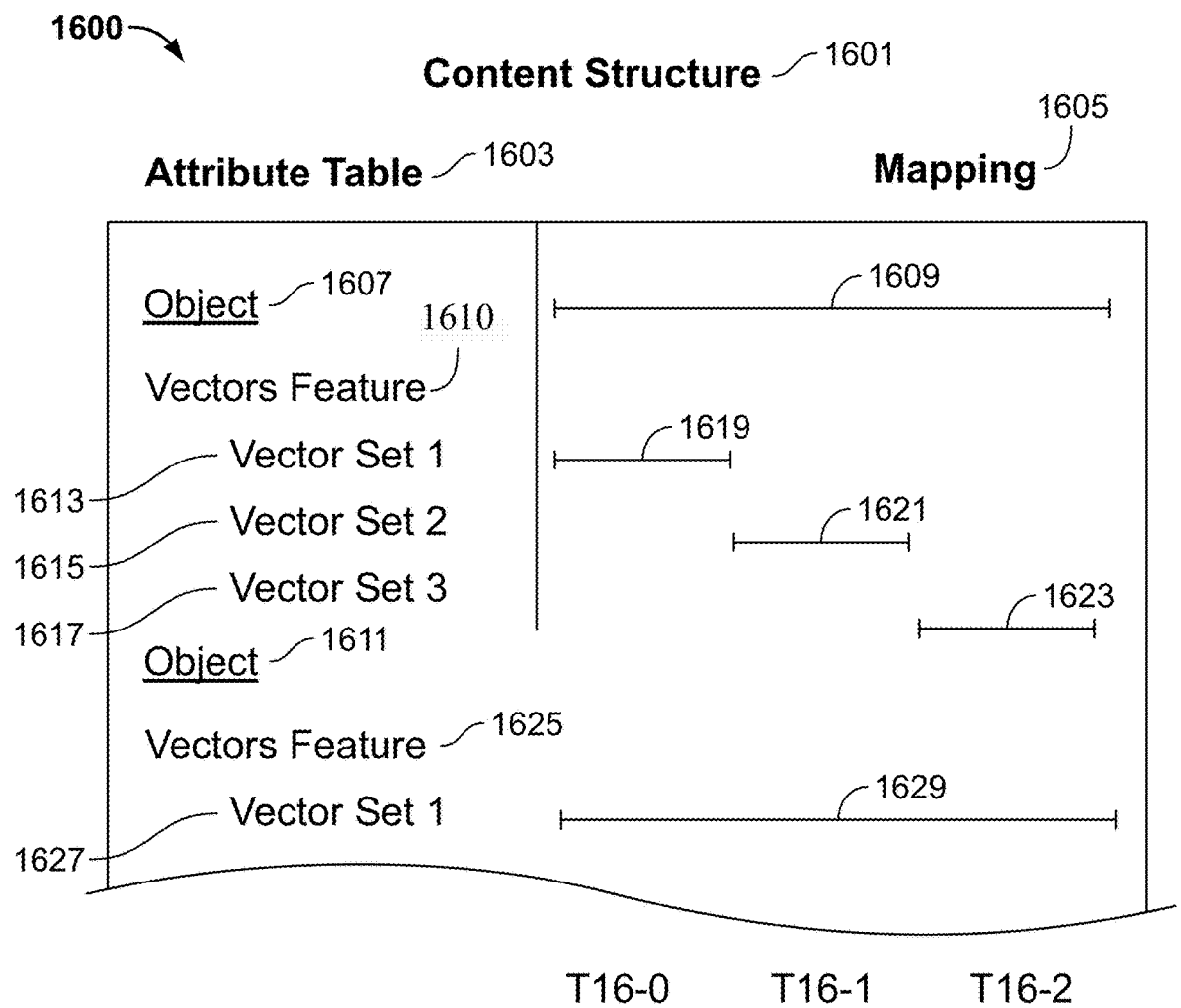
FIG. 16 provides and additional diagram illustrating an exemplary content structure including an attribute table and associated mapping generated from video frames of a content segment, according to some embodiments described herein.

FIG. 16 provides another view 1600 of a content structure 1601 (e.g., content structure 1600 may be the same as content structure 133 shown in FIGS. 4-5 or may be another unrelated content structure). For example, content structure 1601 may be a structure generated based on frames of a source content segment, e.g., as shown below in FIG. 18. As shown, the duration of the source content is divided into smaller time units such as time periods T16-0, T16-1, and T16-2. Every mapping corresponding to a specific attribute value is then associated with the presence indicator that corresponds to time periods T16-0, T16-1, and T16-2.

In particular, in addition to, or instead of, other feature mapping (e.g., as shown and described by FIGS. 6a-d), content structure 1601 may define mapping 1605 of vector features (e.g., vector features 1611 and 1625) for each object identified in the source content segment (e.g., as shown below in FIG. 18). For example, content deconstruction engine 130 may identify two objects in the sources content segment, e.g., object 1607 and object 1611. In one example, content deconstruction engine 130 identifies object 1 of FIG. 19 as object 1607 and object 2 of FIG. 19 as object 1611. In some embodiments, content deconstruction engine 130 may detect objects 1611 and 1625 using AI computer vision techniques, edge detection techniques, or any other object identification technique.

Once objects 1607 and 1611 are identified, content deconstruction engine 130 may generate a vector data structure (e.g., set of vectors defining multiple polygons) based on each object. The vector data structure for an object may include data defining interconnected vectors or polygons, such that when those vectors or polygons are rendered or rasterized (e.g., by a graphics engine) the resulting rendering or raster represents the same object or resembles the object with sufficient similarity. For example, for object 1607, content deconstruction engine 130 may have identified three different forms, e.g., object 1607 may have undergone change across frames of the source content segment. In one embodiment, object 1607 is a visual representation of a boy walking across a road (e.g., as shown in FIG. 18). As shown, the boy is walking and therefore appears differently in different frames (e.g., at times T16-0, T16-1, and T16-2). Accordingly, content deconstruction engine 130 may generate a different vector set (e.g., three set of vectors 1613, 1615, and 1617) for each time period times T16-0, T16-1, and T16-2. In one example, vector set 1613 corresponds to vector structure 2001 of FIG. 20, vector set 1615 corresponds to vector structure 2009 of FIG. 20, and vector set 1617 corresponds to vector structure 2011 of FIG. 20.

Vector sets 1613, 1615, and 1617 may then be stored as part of content structure 1601. For example, content deconstruction engine 130 may store the vector as part of vector features, e.g., as part of vector feature 1610 of object 1607 and as part of vector feature 1625 of object 1611. For example, vector set 1613 may define the appearance of object 1607 at time period T16-0. This timing may be stored in mapping 1605 and be represented by relative location mappings 1619. That is, relative location mapping 1619 stretching across time period T16-0 indicates the persistence of object 1607 in a shape represented by vector set 1613 for time period T16-0. Similarly, relative location mapping 1621 indicates the persistence of object 1607 in a shape represented by vector set 1615 for time period T16-1, and relative location mapping 1623 indicates the persistence of object 1607 in a shape represented by vector set 1617 for time period T16-2. Additionally, the persistence of object 1607 across all three time periods T16-0, T16-1, and T16-2 is represented by relative location mapping 1609 stretching across all three time periods T16-0, T16-1, and T16-2.

Similarly, content deconstruction engine 130 may have created a vector data structure for object 1611. In some embodiments, object 1611 may be a static (e.g., background) object that remains the same across time periods T16-0, T16-1, and T16-2. For example, object 1611 may be road object 1905 from FIG. 19. Because, object 1611 remains constant for all three time periods, content deconstruction engine 130 may generate a single vector feature 1625 for object 1611 that has only a single vector set 1627 that has relative location mapping 1629 stretching across time periods T16-0, T16-1, and T16-2. For example, vector set 1627 may be a set of vectors shown by element 2007 of FIG. 20.

In some embodiments, each object 1607 may be further subdivided into sub-objects, each having its own vector sets associated with sub-portions of object 1607. For example, object 1607 (e.g., when it depicts a boy shown in FIG. 18) may have sub-objects: "Hair," "Legs," "Head," "Arms," "Shoes," "Eyes," "Ears." Each of these sub-objects may be separately vectorized and stored in content structure 1601 in the same was as other objects (e.g., objects 1607 and 1611). Each of these sub-objects may have vector sets with associated relative location mappings defining the presence in different time periods. In some embodiments, each of feature mappings (e.g., feature mappings $135a_{1-n}$) may have an associated vector feature. For example, if there is a feature mapping "blushing," that feature mapping may have an associated vector feature (e.g., vector set shown by element 2105 of FIG. 21) that defines the appearance of the blush spot. In this way, when any of the features are modified, e.g., as described below, content construction engine 330 may modify only the identified set of vectors. For example, if the user were to request the removal of "blushing" feature, content construction engine 330 can remove only the vector set 2105 and leave the rest of vectors 2101 in place in content structure 1601.

Because content structure 1601 fully defines vector sets for all objects, the objects may be fully reconstructed by content construction engine 330 from content structure 1601. For example, content construction engine 330 may create a new content segment by reconstructing objects 1607 and 1611 (e.g., by converting vectors to raster images) in a frame-by-frame manner. For example, content construction engine 330 may rasterize vector set 1613 and vector set 1627 to create a frame for time period T16-0. Similarly, content construction engine 330 may rasterize vector set 1615 and vector set 1627 to create a frame for time period T16-1, and rasterize vector set 1617 and vector set 1627 to create a frame for time period T16-2. When all three frames are combined, the original content segment is reconstructed. If any of the vector sets 1613, 1615, 1617, and 1627 were changed, a new content segment is constructed instead.

While only two objects and three time periods are depicted, one skilled in the art would readily understand that content structure 1601 may include any number of objects (each with any number of vector sets), with mappings across any number of time periods.

Figure 17:
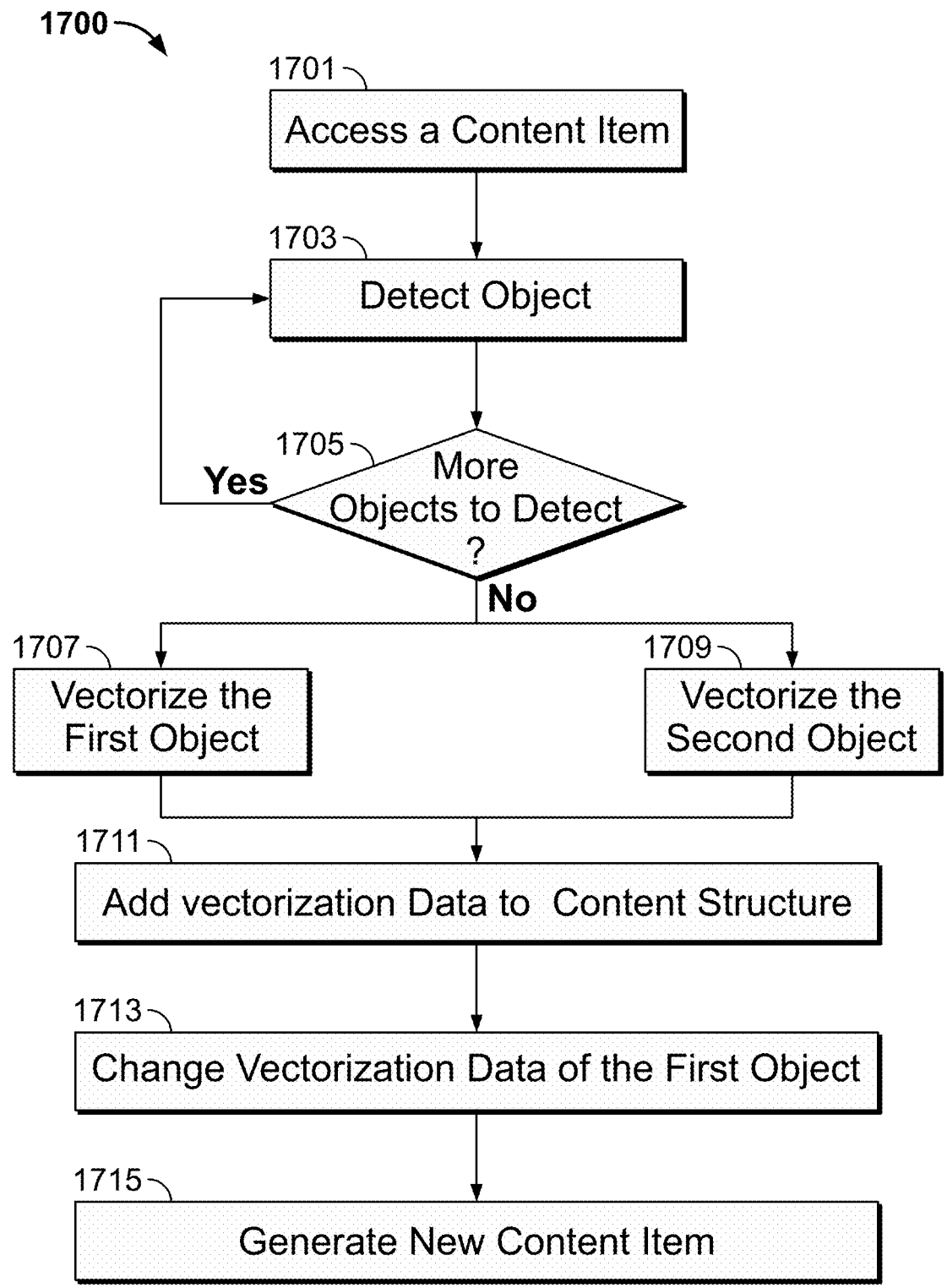
FIG. 17 provides a flowchart for a method of generating content, according to some embodiments described herein.

FIG. 17 provides a flowchart of process 1700 for generating content, according to some embodiments described herein. In some embodiments, the description below may refer to processing source content segment 1800 depicted in FIG. 18. However, process 1700 may be applied to analyzing any other content segment. In some embodiments, the steps of process 1700 may be performed by one of or both content deconstruction engine 130 and content construction engine 330.

At 1701 content deconstruction engine 130 may access a source content segment (e.g., a full content item, or a portion of the content item). For example, content deconstruction engine 130 may access a content segment from buffer 120. The content segment may include several frames (e.g., three frames of a video). For example, source content segment 1800 may include frames 1801, 1803, and 1805 as depicted by FIG. 18. At 1703, content deconstruction engine 130 may apply object detection and object pathing techniques to identify objects present in any of the frames as well as objects present in multiple frames of the source content segment. For example, content deconstruction engine 130 may identify a first object present in all frames of the sources content segment. Additionally, content deconstruction engine 130 may extract raster data of the first object from each object.

At 1705, content deconstruction engine 130 checks if all objects are detected, or if more objects remain to be detected. For example, content deconstruction engine 130 may check if any frames of the sources content segment have a portion of the raster data that does belong to any of the currently detected objects. If more objects remain, content deconstruction engine 130 may return to 1703 to detect the next object (e.g., a second object). When no objects remain to be detected (e.g., when all raster data of all frames have been assigned to at least one object), process 1700 proceeds to 1707 and 1709. Steps 1707 and 1709 describe processing two objects, however any number of objects may be processed.

At 1707, content deconstruction engine 130 may generate a first data structure that includes attributes of the first object that are sufficient to reconstruct the first object. In some embodiments, the first data structure may be content structure 1601 that includes vectorizations of the first object as it appears across frames of the source content segment. For example, content deconstruction engine 130 may generate sets of vectors for each appearance of the first object in frames, e.g., if the first object appears in three frames, content deconstruction engine 130 generates three vector representations that are stored, e.g., as vector sets 1613, 1615, 1617. Each object may be vectorized using a vectorization technique such as image tracing or raster-to-vector conversion algorithm.

At 1709, content deconstruction engine 130 may generate a second data structure that includes attributes of the second object that are sufficient to reconstruct the second object. In some embodiments, the second data structure may be content structure 1601 that includes vectorizations of the second object as it appears across frames of the source content segment. For example, content deconstruction engine 130 may generate sets of vectors for each appearance of the second object in frames, e.g., if the first object appears in three frames in the same way, content deconstruction engine 130 may generate a single vector representation that is stored, e.g., as vector set 1627. Each object may be vectorized using vectorization technique such as image tracing or raster-to-vector conversion algorithm.

At 1711, content deconstruction engine 130 may store the vector sets generated in step 1707 in a single content data structure (e.g., in structure 1601). The resulting data structure may be stored in storage 319 for current and future use.

At step 1713, content construction engine 330 may modify the first data structure by changing an attribute of the first plurality of attributes, e.g., by changing the first vectorization data of the first object. For example, construction engine 330 may perform the changes in response to a user request to generate a new content segment that includes the first and second object. In some embodiments, the user may request a modification by modifying features of content structure 1601. For example, content deconstruction engine 130 may modify some of the vectors in the vectorized representation of the first object (e.g., by modifying size or color of the vectors.) For example, all vectors may be increased by a certain factor to increase the size of the first object. In another example, all vectors may be changed to a different color to achieve a color change of the object.

In another example, construction engine 330 may replace the vector data of a first object with vector data of another object. For example, construction engine 330 may retrieve vector data of another object and resize that data to match the size defined by vectorized representation of the first object. Since vector sets provide exact sizing, the first object may be replaced by a new object that has been resized precisely for each frame of the content segment.

In another example, vectorized representation of the first object may include a vectorized representation of a sub-portion of the first object. For example, if the first object is representation of a boy 2101 of FIG. 21, the vectorized representation of a sub-portion of the first object may be a vectorized representation of the blush mark (e.g., as shown in element 2105 of FIG. 21). In this case, 'blushing" may be one of the features of content structure 1601. When a user requests removal of the "blushing" feature, construction engine 330 may remove vectors that define the blush from the vector sets that define the depiction of a boy (e.g., from vector sets 1613, 1615, and 1617). In another example, the user may request a change in the sub-portion. For example, the user may request a change from "blushing" to "deeply blushing." In this case, content deconstruction engine 130 may modify the color of vectors that define the blush mark (e.g., to be more deeply red).

At 1715, construction engine 330 may generate a resulting content segment by reconstructing a first modified object based on the first modified data structure and reconstructing the second object based on the second data structure. For example, for each time period of content structure 1601, construction engine 330 may rasterize each vector set of each object present in each time period. For example, construction engine 330 may rasterize the modified vector set of the first object in each time period, and rasterize the vector set of the second object in each time period. A frame is then generated for each time period by overlaying the rasterized images generated from each vector set. Finally, construction engine 330 may arrange all generated frames to follow each other. The resulting frame sequence may be a video clip that comprises several reconstructed frames.

Figure 18:
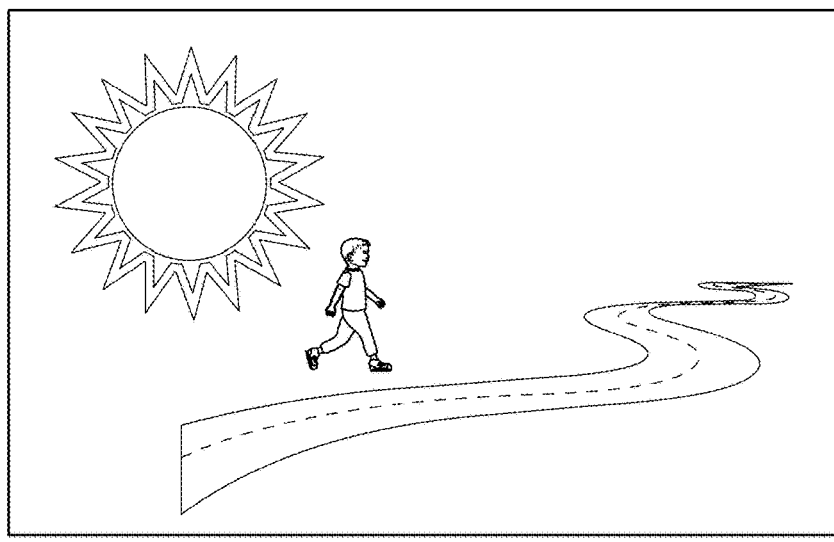
FIG. 18 provides an exemplary set of frames of a content segment, according to some embodiments described herein.
Figure 18:
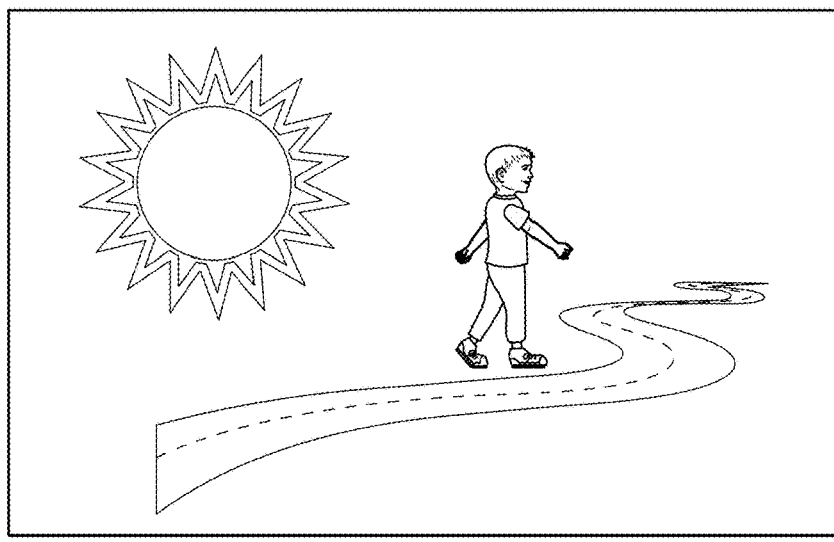
Figure 18:
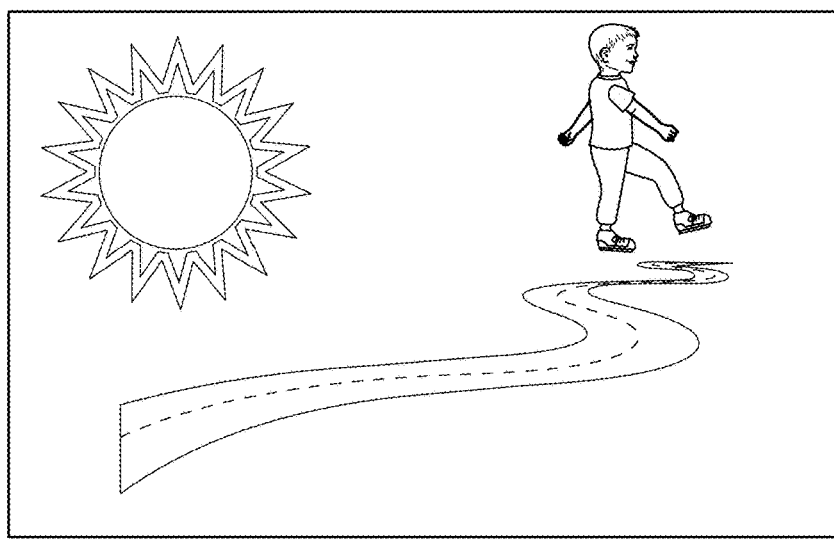

FIG. 18 provides an exemplary set of frames of a content segment 1800, according to some embodiments described herein. In particular, content segment 1800 may include frame 1801 depicting a boy walking along a road. Content segment 1800 may also includes frames 1803 and 1805, showing the progression of the boy along the road, while the road and the sun remain static. In some embodiments, frame 1801 corresponds to time period T16-0 of FIG. 16. Similarly, frame 1803 may corresponds to time period T16-1 of FIG. 16, and frame 1805 may corresponds to time period T16-2 of FIG. 16.

Figure 19:
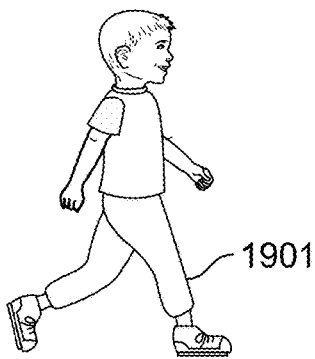
FIG. 19 provides an exemplary set of detected objects, according to some embodiments described herein.
Figure 19:
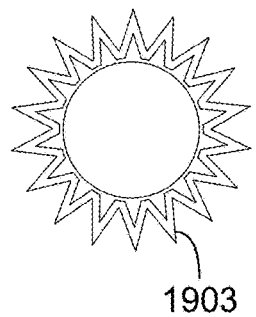
Figure 19:
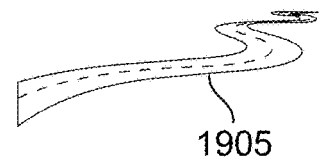
Figure 19:
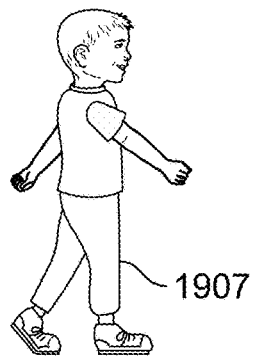
Figure 19:
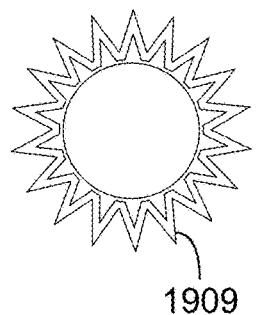
Figure 19:
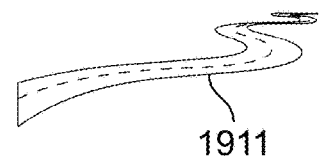
Figure 19:
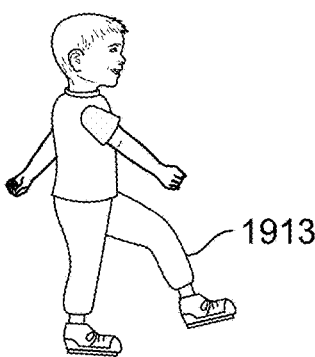
Figure 19:
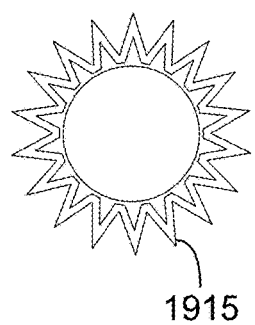
Figure 19:
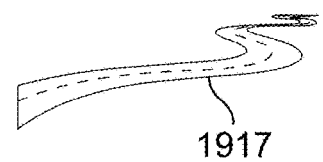

FIG. 19 provides an exemplary set 1900 of detected objects, according to some embodiments described herein. For example, the set of objects 1900 may include objects detected at step 1703 by process 1700. For example, content construction engine 330 may determine that at time T16-0, content segment 1800 includes three objects: walking boy 1901, sun 1903, and road 1905. Similarly, content construction engine 330 may determine that at time T16-1 content segment 1800 includes three objects: walking boy 1907 (in a different pose), sun 1903 (looking the same as sun 1903), and road 1911 (looking the same as road 1905). Further, content construction engine 330 may determine that at time T16-2, content segment 1800 includes three objects: walking boy 1913 (in a third pose), sun 1915 (looking the same as sun 1903), and road 1917 (looking the same as road 1905). At this point, the identified objects 1901-1917 may be stored as raster objects.

Figure 20:
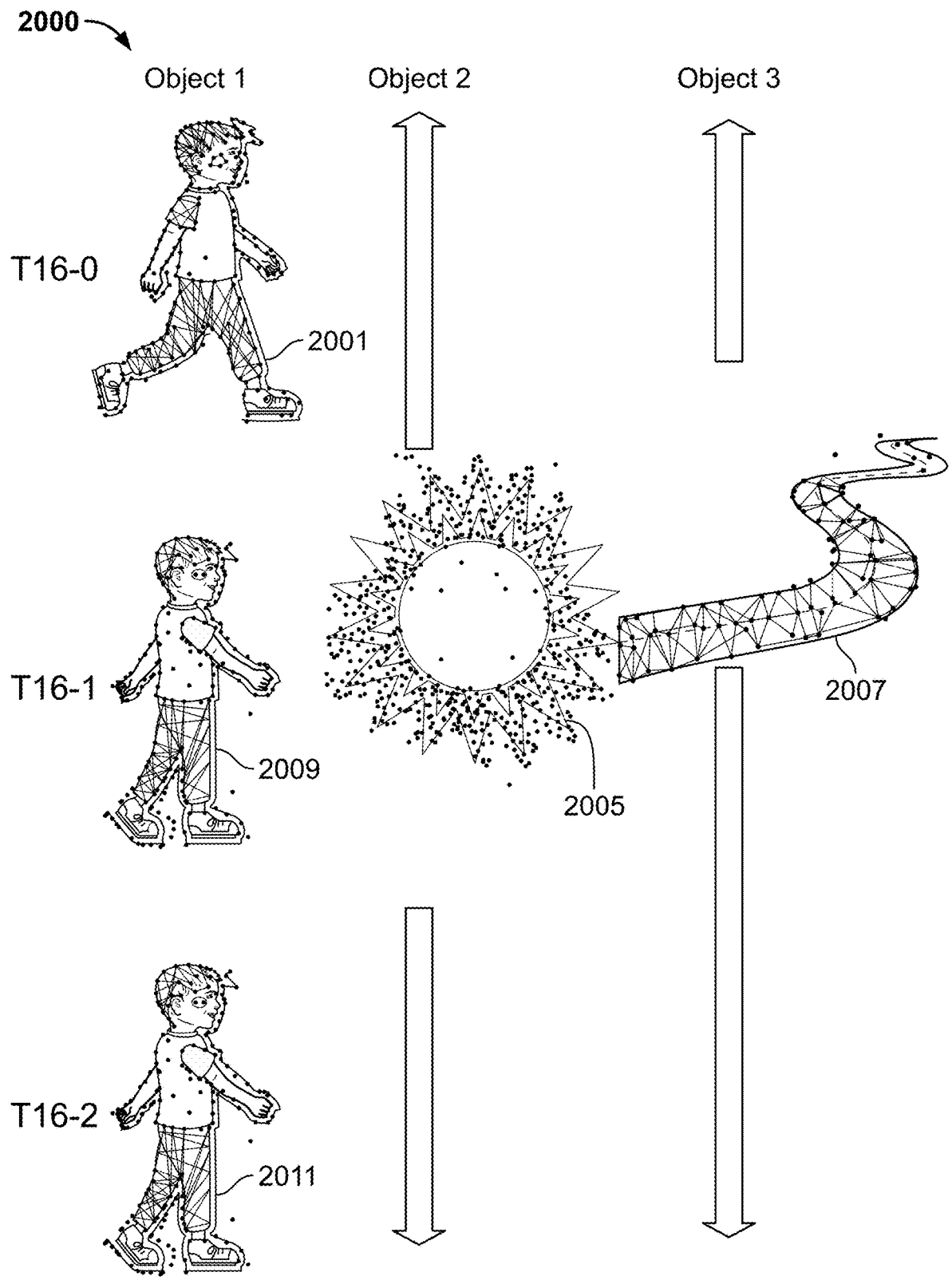
FIG. 20 provides an exemplary set of vectorized detected objects, according to some embodiments described herein.

FIG. 20 provides an exemplary set 2000 of vectorized detected objects, according to some embodiments described herein. For example, each object 1901-1917 may be converted to vector objects 2001-2011. For example, content deconstruction engine 130 may generate, by any known vectorization technique, vector set 2001 based on raster object 1901, vector set 2009 based on raster object 1907, and vector set 2011 based on raster object 1913.

Each of the vector objects may define points and vector connections between points to create multiple polygons. With enough polygons, objects 1901, 1907, and 1913 may be recreated (e.g., using rasterization techniques) with enough fidelity based on vector sets 2001, 2009 and 2011.

In some embodiments, content deconstruction engine 130 may recognize that objects 1903, 1909, and 1915 are identical to each other and that objects 1905, 1911, and 1917 are also identical to each other. As a result, content deconstruction engine 130 may generate a single vector set 2005 for objects 1903, 1909, and 1915 and a single vector set 2007 for objects 1905, 1911, and 1917. Once vector set objects are created, they may be stored as part of content structure 1601 along with timing mapping 1605, to indicate correspondence between vector sets and the times at which they are present. The content structure 1601 may then be used to fully reconstruct all frames of content segment 1800, as describe in relation to FIG. 18.

Figure 21:
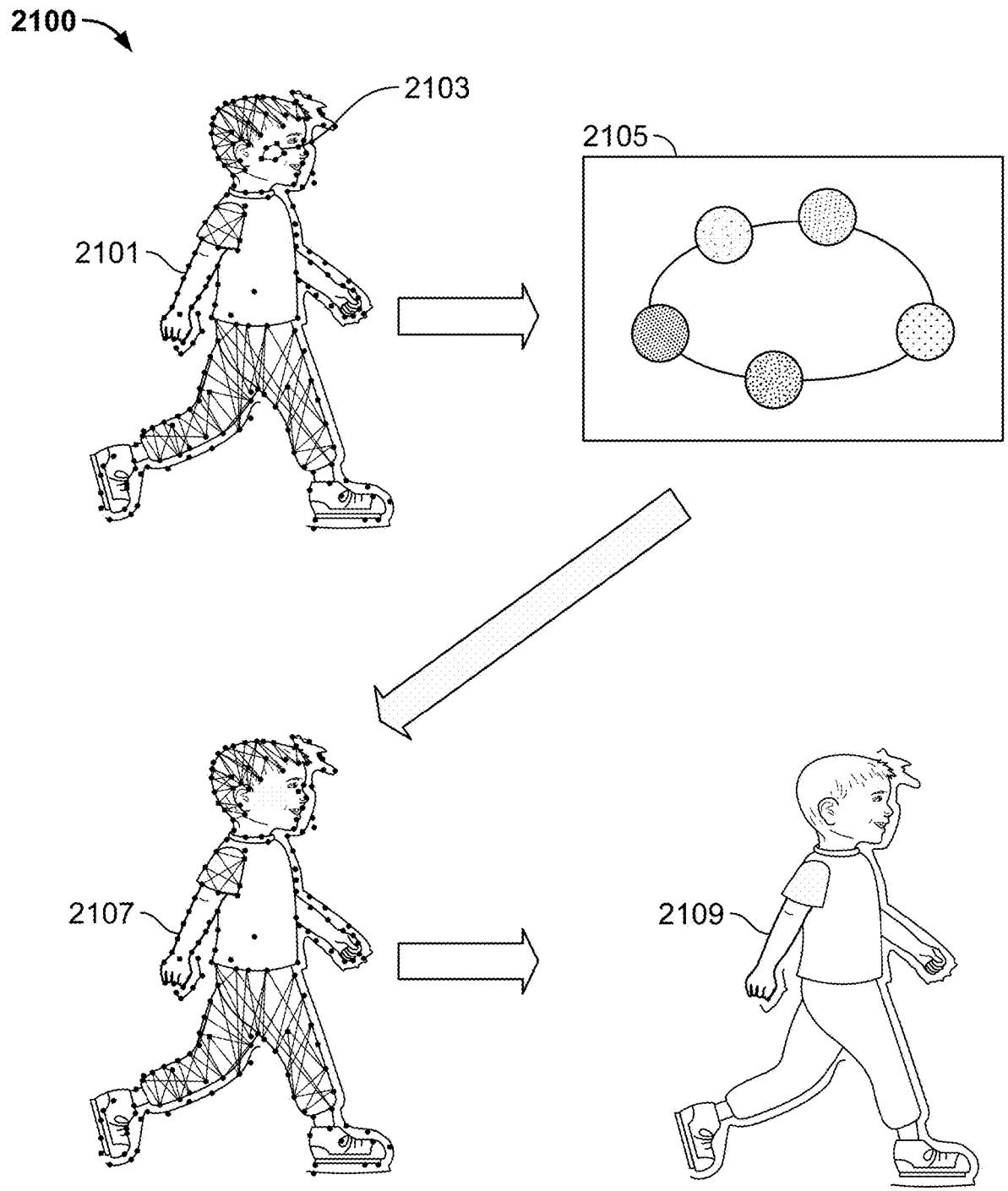
FIG. 21 provides a diagram illustrating aspects of creating new content from previously created and stored content structures, according to some embodiments described herein.

FIG. 21 provides a diagram 1800 illustrating aspects of creating new content from previously created and stored content structures, according to some embodiments described herein. For example, vector set 2101 (e.g., the same vector set as vector set 2001) may include a sub-vector set 2105 that defined the blush mark. Each of vector sets 2009, and 2011 may also have a blush mark sub-vector set (not shown). The "blushing" feature may be included in content structure 1601 to define that the blushing of the boy that appears in frames 1801-1808 at time periods T16-0, T16-1, and T16-2.

In some embodiments, the user may request removal of the blush mark, e.g., by using a user interface to remove "blushing" feature from content structure 1601. In response, construction engine 330 may then remove the vectors of sub-vector set 2105 from vector set 2101 to result in vector set 2107 that no longer defines the blush mark. The modified vector set 2107 may then be stored in place of vector set 1613 of FIG. 16. In some embodiments, similarly, vector sets 1615 and 1617 are also modified to remove respective vectors that define blush marks in frames 1803 and 1805.

Then, construction engine 330 creates a new content segment based on content structure 1601. For example, construction engine 330 rasterizes vector set 2107 resulting in a raster representation of a boy 2109 without a blush mark. Similar effect is achieved when the modified vector sets 1615, and 1617, are rasterized. When rasterized objects are combined into frames, and the frames are encoded, the end result is a content segment similar to content segment 1800 but with the boy lacking the blush mark in all three frames 1801, 1803, 1805.

Figure 22:
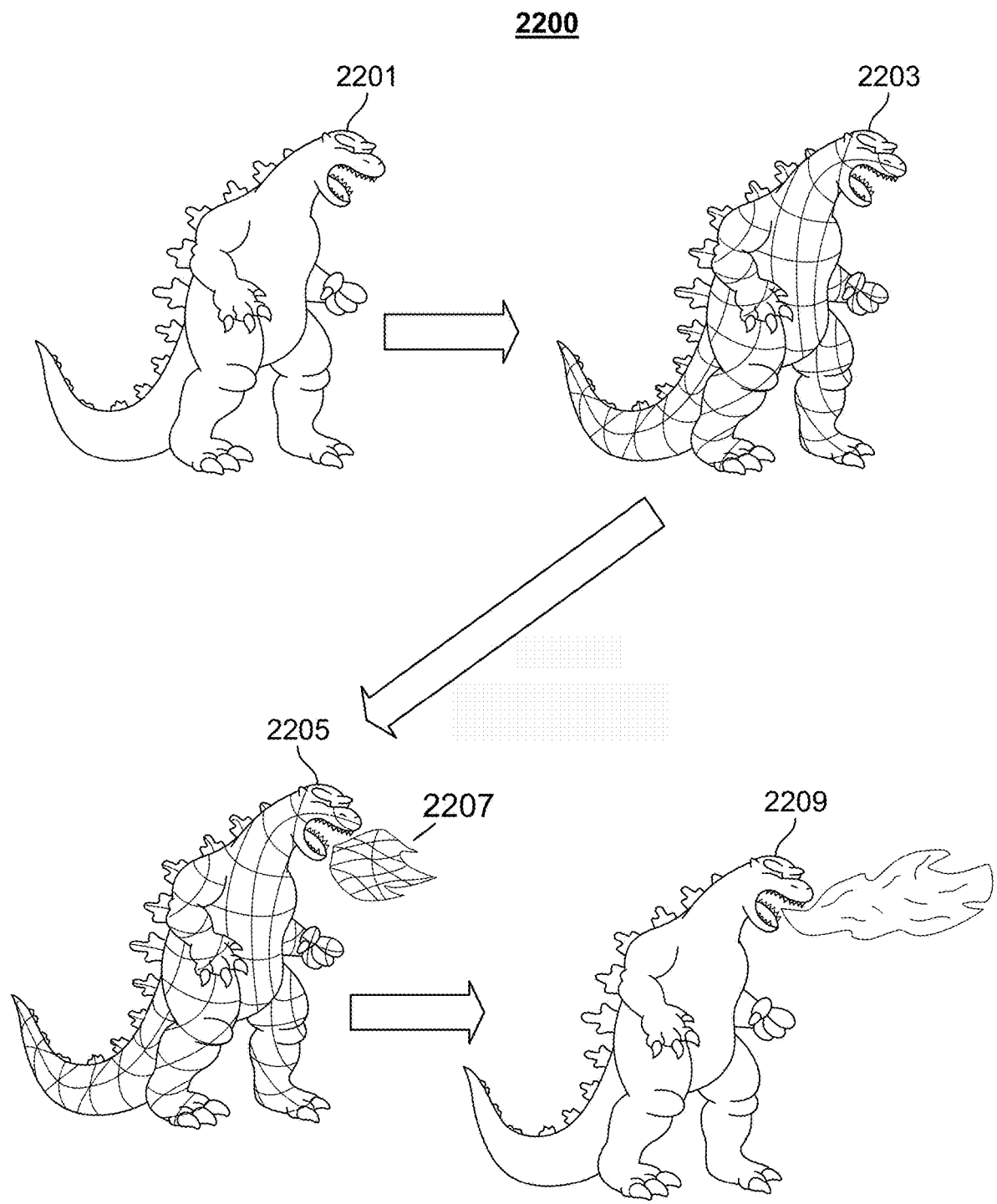
FIG. 22 provides another diagram illustrating aspects of creating new content from previously created and stored content structures, according to some embodiments described herein.

FIG. 22 provides another diagram 2200 illustrating aspects of creating new content from previously created and stored content structures, according to some embodiments described herein. In this example, instead of a boy shown in FIGS. 18-21, the content segment may contain a monster 2201. In this example, frames 1801-1805 may show the monster walking along the road instead of a boy. In this example, content deconstruction engine 130 may extract raster data of the monster from each frame of the content segment (e.g., as shown in elements 1901, 1907, 1913).

In step 2203, content deconstruction engine 130 may vectorize the raster data of the monster (e.g., from element 1901). In this example, content deconstruction engine 130 may generate a three-dimensional (3D) vector set 2203. In some embodiments, deconstruction engine 130 may use data from several frames to extrapolate the 3D vector set 2203. For example, content deconstruction engine 130 may generate 3D vector set 2203 based on elements 1901, 1907, and 1913 by using a technique described in *Automatic 2d-To-3d Video Conversion Technique Based On Depth-From-Motion And Color Segmentation*, Lai-Man Po, et al., IEEE 10th International Conference On Signal Processing Proceedings, 2010 (which is herein incorporated by reference). Advantageously, once 3D vector set 2203 it vectorized, it can be used by construction engine 330 in many different ways. For example, construction engine 330 may rotate vector set 2203 to generate raster data for showing the monster from any angle.

The "monster" vector object may be included in content structure 1601 to define that the appearance of the monster in frames 1801-1808 at time periods T16-0, T16-1, and T16-2. In some embodiments, the user may request a change in the monster (e g, making the monster breathe fire). For examine, a user may use a user interface to add "firebathing" feature to content structure 1601. In response, construction engine 330 may then add a vector set 2207 that represent fire to vector set 2203 (e.g., vector set 2207 may be retrieved from library of vector sets and combined with vector set 2203) to create vector set 2205. The modified vector set 2207 may then be stored in place of vector set 1613 of FIG. 16. In some embodiments, similarly, vector sets 1615 and 1617 are also modified to add vectors that define fire in frames 1803 and 1805.

Then, construction engine 330 creates a new content segment based on content structure 1601. For example, construction engine 330 rasterizes vector set 2209 resulting in a raster representation of a monster 2205 that breathes fire. Similar effect is achieved when the modified vector sets 1615, and 1617, are rasterized. When rasterized objects are combined into frames, and the frames are encoded, the end result is a content segment similar to content segment 1800 but with a monster breathing fire in all three frames 1801, 1803, 1805.

Figure 23:
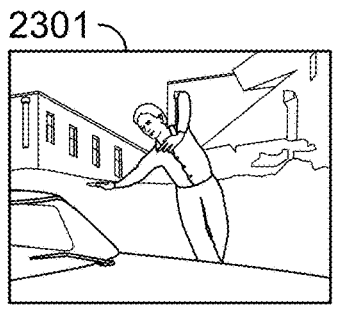
FIG. 23 provides yet another diagram illustrating aspects of creating new content from previously created and stored content structures, according to some embodiments described herein.
Figure 23:
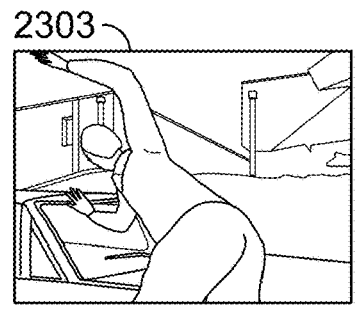
Figure 23:
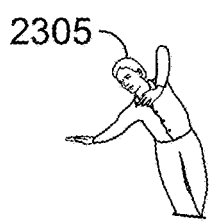
Figure 23:
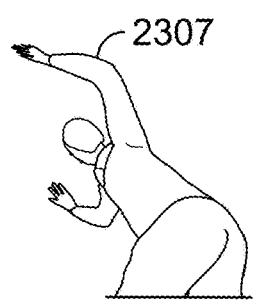
Figure 23:
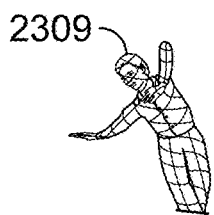
Figure 23:
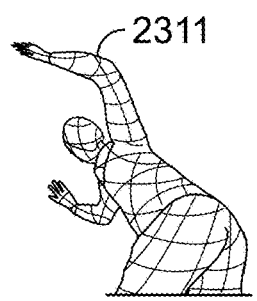
Figure 23:
Figure 23:
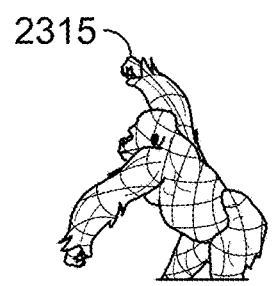
Figure 23:
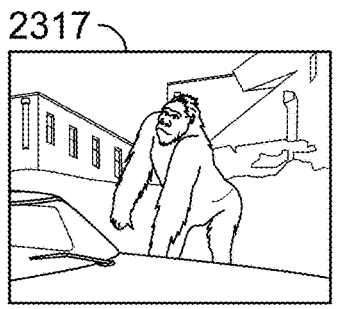
Figure 23:
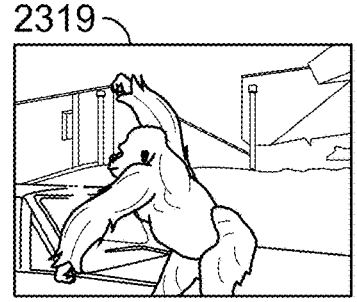

FIG. 23 provides another diagram 2300 illustrating aspects of creating new content from previously created and stored content structures, according to some embodiments described herein. In particular, diagram 2300 provides additional embodiment of processing and modifying video frames 125*a-n* of FIGS. 3A-3B. For example, frame 2301 may correspond to fame 125*a* and frame 2303 may correspond to frame 125*n*. Other frames 125*b*-125(*n*–1) may also be modified in the similar manner.

In some embodiments, content deconstruction engine 130 may identify various objects in frames 2301, and 2303. For example, human 2305 and human 2307 is identified in corresponding frames (e.g., as described with relation to FIGS. 3A-3B). In the shown embodiment, each of identified object 2305 and human 2307 cam be vectorized by content deconstruction engine 130 (e.g., using techniques described above) to generate vector sets 2309 and 2311, respectively. Each of the vector sets 2309 and 2311 may be stored in a content structure (e.g., in content structure 133 as described in relation to FIG. 5), as one of attributes of the human object that was identified in frames 2301 and 2303. For examine, features 135a may include a full vector set with a mapping 132 that associate each vector set with respective one of time period $t1_0$-$t1_2$.

The inclusion of the vectors sets significantly simplifies any future modification to content structure 133 by construction engine 330. For example, as described in relation to FIGS. 3-4, content structure 133 may defined the type of object as "human." In some embodiments, the user may request a change of the type of object to "gorilla." In this case, construction engine 330 may look up its database of vector sets depicting a gorilla, and resize those vector sets to fit the seize of vector sets 2309 and 2311. For example, vector set 2313 may be extracted from a database and resized to fit the sizes of vector set 2309. Similarity, vector set 2315 may be extracted from a database and resized to fit the sizes of vector set 2311. In some embodiments, construction engine 330 may search for most similar looking for an available vector set that most closely resembles vector sets 2313 and 2315.

The, construction engine 330 may modify content structure 133 by changing the stored vector set for each time period, with a modified vector sets that represent a "gorilla" character. Subsequently, when construction engine 330 uses the modified content structure 133 to recreate a content segment, each frame will include a rendered depiction of a gorilla in place of a human. For example, construction engine 330 may generate frames 2317 and 2319 depicting a gorilla in place of a human by rasterizing all objects in modified content structure 133. In this way all frames 125a-n may be modified to switch the character with any other character, as long as an appropriate vector set is available in a database of characters. Because all other objects from frames were nor changed, the resulting content segment will be exactly the same as the initial one except for the replacement of a human character with a gorilla character.

It is contemplated that the actions or descriptions of each of FIGS. 1-23 may be used with any other embodiment of this disclosure. In addition, the actions and descriptions described in relation to FIGS. 1-23 may be done in alternative orders or in parallel to further the purposes of this disclosure.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry. The processing circuitry, for instance, may be a general-purpose processor, a customized integrated circuit (e.g., an ASIC), or a field-programmable gate array (FPGA) within the content construction engine or the content deconstruction engine described through the disclosure.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for generating content, the method comprising:

identifying a first object depicted in at least one frame of a source content segment;

generating a first data structure that comprises a first plurality of attributes of the first object, wherein the first object can be reconstructed based on the first data structure;

accessing a second data structure that comprises a second plurality of attributes of a second object, wherein the second object can be reconstructed based on the second data structure;

modifying the first data structure by changing a first attribute of the first plurality of attributes based on a second attribute of the second plurality of attributes, such that an object that is reconstructed based on the first modified data structure is visually different from the first object, wherein the first attribute is expressed in the depiction of the first object in the at least one frame of the source content segment; and generating a resulting content segment by reconstructing a first modified object based on the first modified data structure and replacing the first object in the at least one frame with the first modified object.

2. The method of claim 1, further comprising:

identifying the second object depicted in the at least one frame of the source content segment;

generating the second data structure that comprises the second plurality of attributes of the second object, wherein the second object can be reconstructed based on the second data structure; and wherein generating the resulting content segment further comprises reconstructing the second object based on the second data structure.

3. The method of claim 1, wherein one attribute of the first plurality of attributes is a vectorized representation of the first object.

4. The method of claim 3, wherein modifying the first data structure comprises modifying the vectorized representation of the first object.

5. The method of claim 4, wherein modifying the vectorized representation of the first object comprises removing a portion of vectors of the vectorized representation of the first object and adding new vectors to the vectorized representation of the first object.

6. The method of claim 4, wherein modifying the vectorized representation of the object comprises changing a color of a portion of vectors of the vectorized representation of the first object.

7. The method of claim 4, wherein modifying the vectorized representation of the object comprises resizing a portion of vectors of the vectorized representation of the first object.

8. The method of claim 4, wherein modifying the vectorized representation of the object comprises replacing the vectorized representation of the first object with a vectorized representation of a third object, wherein the third object is resized to be the same size as the first object.

9. The method of claim 3, wherein the vectorized representation of the first object comprises a vectorized representation of a sub-portion of the first object.

10. The method of claim 9, wherein modifying the first data structure comprises modifying the vectorized representation of the sub-portion of the first object.

11. A system for generating content, the system comprising:
storage circuitry configured to store a data structure; and
control circuitry configured to:
identify a first object depicted in at least one frame of a source content segment;
generate a first data structure that comprises a first plurality of attributes of the first object, wherein the first object can be reconstructed based on the first data structure;
access a second data structure that comprises a second plurality of attributes of a second object, wherein the second object can be reconstructed based on the second data structure;
modify the first data structure by changing a first attribute of the first plurality of attributes based on a second attribute of the second plurality of attributes, such that an object that is reconstructed based on the first modified data structure is visually different from the first object, wherein the first attribute is expressed in the depiction of the first object in the at least one frame of the source content segment; and
generate a resulting content segment by reconstructing a first modified object based on the first modified data structure and replacing the first object in the at least one frame with the first modified object.

12. The system of claim 11, wherein the control circuitry is further configured to:
identify a second object depicted in the at least one frame of the source content segment;
generate a second data structure that comprises a second plurality of attributes of the second object, wherein the second object can be reconstructed based on the second data structure; and
wherein the control circuitry is further configured to generate the resulting content segment by reconstructing the second object based on the second data structure.

13. The system of claim 11, wherein one attribute of the first plurality of attributes is a vectorized representation of the first object.

14. The system of claim 13, wherein the control circuitry, when modifying the first data structure, is configured to modify the vectorized representation of the first object.

15. The system of claim 14, wherein the control circuitry, when modifying the vectorized representation of the first object, is configured to remove a portion of vectors of the vectorized representation of the first object and add new vectors to the vectorized representation of the first object.

16. The system of claim 14, wherein the control circuitry, when modifying the vectorized representation of the object, is configured to change a color of a portion of vectors of the vectorized representation of the first object.

17. The system of claim 14, wherein the control circuitry, when modifying the vectorized representation of the object, is configured to resize a portion of vectors of the vectorized representation of the first object.

18. The system of claim 14, wherein the control circuitry, when modifying the vectorized representation of the object, is configured to replace the vectorized representation of the first object with a vectorized representation of a third object, wherein the third object is resized to be the same size as the first object.

19. The system of claim 13, wherein the vectorized representation of the first object comprises a vectorized representation of a sub-portion of the first object.

20. The system of claim 19, wherein the control circuitry, when modifying the first data structure, is configured to modify the vectorized representation of the sub-portion of the first object.

* * * * *